(12) United States Patent
Glinberg et al.

(10) Patent No.: US 8,117,115 B2
(45) Date of Patent: *Feb. 14, 2012

(54) SYSTEM AND METHOD FOR ACTIVITY BASED MARGINING

(75) Inventors: Dmitriy Glinberg, Northbrook, IL (US); Tae S. Yoo, Bartlett, IL (US); Jodi L. Abudarham, Highland Park, IL (US); Dale A. Michaels, Westmont, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/160,250

(22) Filed: Jun. 14, 2011

(65) Prior Publication Data

US 2011/0246350 A1    Oct. 6, 2011

Related U.S. Application Data

(63) Continuation of application No. 12/815,013, filed on Jun. 14, 2010, now Pat. No. 7,996,302, which is a continuation of application No. 11/030,815, filed on Jan. 7, 2005, now Pat. No. 7,769,667.

(60) Provisional application No. 60/608,787, filed on Sep. 10, 2004.

(51) Int. Cl.
*G06Q 40/00* (2006.01)

(52) U.S. Cl. .......................................... 705/37; 705/38

(58) Field of Classification Search ............... 705/35–38
See application file for complete search history.

(56) References Cited

U.S. PATENT DOCUMENTS

| | | | |
|---|---|---|---|
| 5,557,517 A | 9/1996 | Daughterty, III | |
| 5,884,286 A | 3/1999 | Daughtery, III | |
| 5,963,923 A | 10/1999 | Garber | |
| 6,064,985 A | 5/2000 | Anderson | |
| 6,263,321 B1 | 7/2001 | Daughtery, III | |
| 6,321,212 B1 | 11/2001 | Lange | |
| 6,360,210 B1 | 3/2002 | Wallman | |
| 6,938,009 B1 | 8/2005 | Herbst et al. | |
| 7,225,153 B2 | 5/2007 | Lange | |
| 7,395,232 B1 | 7/2008 | Pilato | |
| 7,426,487 B2 | 9/2008 | Glinberg et al. | |
| 7,428,508 B2 | 9/2008 | Glinberg et al. | |
| 7,430,539 B2 | 9/2008 | Glinberg et al. | |
| 7,509,275 B2 | 3/2009 | Glinberg et al. | |
| 7,593,877 B2 | 9/2009 | Glinberg et al. | |
| 7,593,879 B2 | 9/2009 | Glinberg et al. | |
| 7,996,302 B2 * | 8/2011 | Glinberg et al. ................. | 705/37 |
| 2001/0011243 A1 | 8/2001 | Dembo et al. | |
| 2001/0039524 A1 | 11/2001 | Harrison, Jr. et al. | |
| 2001/0042037 A1 | 11/2001 | Kam et al. | |
| 2001/0056392 A1 | 12/2001 | Daughtery, III | |
| 2002/0035531 A1 | 3/2002 | Push | |

(Continued)

OTHER PUBLICATIONS

Sungard, "GMS Global Margin Server", information sheet, SunGard Futures Systems, Chicago, IL, 2 pages, undated.

(Continued)

*Primary Examiner* — Thu Thao Havan
(74) *Attorney, Agent, or Firm* — Lempia Summerfield Katz LLC

(57) ABSTRACT

A system and method for factoring in a trader's trading activity into the margin requirements is disclosed. In the securities arena, day traders are assessed different margins than non-day-traders, however, the specific profile of the trader is analyzed (that is, the same rule applies to all day traders).

18 Claims, 5 Drawing Sheets

U.S. PATENT DOCUMENTS

| | | | |
|---|---|---|---|
| 2002/0042770 A1 | 4/2002 | Slyke et al. |
| 2002/0073018 A1 | 6/2002 | Mulinder et al. |
| 2002/0077947 A1 | 6/2002 | Ward et al. |
| 2002/0091624 A1 | 7/2002 | Glodjo et al. |
| 2002/0107784 A1 | 8/2002 | Hancock et al. |
| 2002/0111874 A1 | 8/2002 | Al-Kazily |
| 2002/0147671 A1 | 10/2002 | Sloan et al. |
| 2002/0194105 A1 | 12/2002 | Klein |
| 2002/0194113 A1 | 12/2002 | Lof et al. |
| 2003/0009408 A1 | 1/2003 | Korin |
| 2003/0014342 A1 | 1/2003 | Vande Pol |
| 2003/0033240 A1 | 2/2003 | Balson et al. |
| 2003/0055765 A1 | 3/2003 | Bernhardt |
| 2003/0061148 A1 | 3/2003 | Alavian |
| 2003/0097331 A1* | 5/2003 | Cohen ........................... 705/39 |
| 2003/0101123 A1 | 5/2003 | Alvarado et al. |
| 2003/0101125 A1 | 5/2003 | McGill et al. |
| 2003/0130917 A1 | 7/2003 | Crovetto |
| 2003/0135448 A1 | 7/2003 | Aguias et al. |
| 2003/0172017 A1 | 9/2003 | Feingold et al. |
| 2003/0208407 A1 | 11/2003 | Dawson |
| 2003/0208430 A1 | 11/2003 | Gershon |
| 2003/0233304 A1 | 12/2003 | Dhurandhar et al. |
| 2003/0236738 A1 | 12/2003 | Lange et al. |
| 2004/0019555 A1 | 1/2004 | Lara |
| 2004/0019557 A1 | 1/2004 | Yaruss et al. |
| 2004/0024692 A1 | 2/2004 | Turbeville et al. |
| 2004/0054613 A1 | 3/2004 | Dokken |
| 2004/0139031 A1 | 7/2004 | Amaitis et al. |
| 2004/0172352 A1 | 9/2004 | Deretz |
| 2004/0225593 A1 | 11/2004 | Frankel et al. |
| 2005/0108128 A1* | 5/2005 | Kastel et al. ................... 705/35 |
| 2005/0137956 A1 | 6/2005 | Flory et al. |
| 2005/0171883 A1 | 8/2005 | Dundas et al. |
| 2006/0009997 A1 | 1/2006 | Felix |
| 2006/0036534 A1 | 2/2006 | Hirani et al. |
| 2006/0059068 A1 | 3/2006 | Glinberg et al. |
| 2007/0219893 A1 | 9/2007 | Xu |
| 2007/0294158 A1 | 12/2007 | Patel et al. |
| 2008/0005002 A1 | 1/2008 | Ferris |
| 2008/0319920 A1 | 12/2008 | Levin et al. |
| 2009/0018969 A1 | 1/2009 | Ayres et al. |
| 2009/0248588 A1 | 10/2009 | Hadi et al. |

OTHER PUBLICATIONS

CME memo to: All Firm Personnel, from Clearing House Department dated Nov. 5, 2004, re: "NYBOT and Margining Options on Futures Calendar Spreads in SPAN®" obtained Dec. 13, 2004 from http://www.cme.com/clearing/rmspan/spanadv/printerFriendly/10536.html., 1 page.

CyberTrader, "Margin Requirements", obtained Dec. 13, 2004 from http://www.cybertrader.com/MarginAndFees/Martin/MarginRequirements. aspx, 3 pages.

Ian Brant, Futures Trading Software—"The Margin Account Calculator" article, The Margin Account Calculator © Copyright All Rights Reserved, obtained Dec. 13, 2004 from http://www.marginaccountcalc.com/ , 6 pages.

CME Audit Advisory Notice, re "Revision to Risk Based Capital Requirement", dated Dec. 15, 2000., obtained Dec. 13, 2004 from http://www.cme.com/clearing/clr/advntc/audit_RBC00-01.html, 2 pages.

John F. Summa, OptionsNerd.com "Smart Options Trading Strategies" article obtained Dec. 13, 2004 from http://www.optionsnerd.com/oex.htm, © 2003 OptionsNerd.com, 3 pages.

Risk Management System article, Business Line, Feb. 8, 2004, pp. 1-2.

Peter Fortune, New England Economic Review, "Margin Requirements Across Equity-Related Instruments: How Level is the Playing Field?", article, Annual, 2003, pp. 2-31.

Joanne M. Hill, Naviwala, Humza, Journal of Portfolio Management, 61, "Synthetic and Enhanced Index Strategies Using Futures on U.S. Indexes (Special Theme: Derivatives & Risk Management)", article, May 1999, pp. 31-44.

Paul Kupiec, OECD Economic Studies, "Stock market volatility in OECD countries: Recent trends, consequences for the real economy and proposals for reform", article, Autumn, 1991, pp. 44-87.

CME Span® "The Standard Portfolio Analysis of Risk" brochure, Copyright © 2004 Chicago Mercantile Exchange Inc., 11 pages.

CME "Powerful technology for Risk Analysis and Management" software pamphlet, Copyright © 2001 Chicago Mercantile Exchange, 6 pages.

CME Span® "Components of SPAN" clearing services data, obtained at http://www.cme.com/clr/rmspan/compont2480.html, Sep. 8, 2004, pp. 1-9.

CME Span® "CME Standard Portfolio Analysis of Risk (SPAN)" clearing services data, obtained at http://www.cme.com/clr/rmspan/rmspan/intro1155.html, Sep. 8, 2004, pp. 1-9.

The Options Clearing Corporation "Margin Methodology" website agreements, obtained at http://www.optionsclearing.com/products/margin.jsp, Sep. 8, 2004, pp. 1-3.

CME "Financial Safeguard System of Chicago Mercantile Exchange", brochure, Copyright © 2004 Chicago Mercantile Exchange Inc., 16 pages.

Mattias Bylund, "A Comparison of Margin Calculation Methods for Exchange Traded Contracts", Feb. 2002, thesis, 92 pages.

Review of Standard Portfolio Analysis of Risk ("SPAN") Margin System as Implemented by the Chicago Mercantile Exchange Board of Trade Clearing Corporation and the Chicago Board of Trade, Commodity Futures Trading Commission Division of Trading Markets, April 200, 18 pages, http://www.cftc.gov/files/tm/tmspan_margin043001.pdf.

Fortune; "Margin Requirements Across Equity-related Instruments: How Level is the Playing field?"; New England Economic Review 31(20); pp. 31-50; Dec. 2003.

PCT International Search Report PCT/US05/31137.
PCT International Search Report PCT/US05/31036.
PCT International Search Report PCT/US05/31136.
PCT International Search Report PCT/US05/31181.
PCT International Search Report PCT/US05/31037.
PCT International Search Report PCT/US05/31050.

CME, Components of SPAN: SPAN: Clearing Services, obtained at http://web.archive.org/web/20030819161552/http://www.cme.com/clr/rmspan/compont2480.html., printed Jan. 9, 2008 from internet archive Aug. 13, 2003, 9 pgs.

Eurex Clearing Risk Based Margining brochure, © Eurex, Jan. 2003, 71 pgs.

International Preliminary Report PCT/US2005/31039.
International Search Report, PCT/US2005/31039.
International Preliminary Search Report PCT/US2008/72887.

Bylund, Matthias, "A Comparison of Margin Calculation Methods for Exchange Traded Contracts", 2002.

International Preliminary Report on Patentability for PCT/US2007/16610, dated Feb. 26, 2009, 10 pages.

International Search Report and Written Opinion for PCT/US2008/85306, dated Feb. 4, 2009, 7 pages.

International Search Report and Written Opinion for PCT/US2007/16610, dated Aug. 8, 2008, 6 pages.

International Search Report and Written Opinion for PCT/US2008/72887, dated Nov. 14, 2008, 7 pages.

International Search Report and Written Opinion for PCT/US20101/047122, dated Oct. 6, 2010, 8 pages.

International Preliminary Report on Patentability for PCT/US2008/072887, dated Aug. 10, 2010, 6 pages.

International Preliminary Report on Patentability for PCT/US2008/085306, dated Jul. 19, 2010, 5 pages.

International Search Report and Written Opinion for PCT/US2010/044840, dated Sep. 27, 2010, 9 pages.

* cited by examiner

SPAN® MINIMUM PERFORMANCE BOND REQUIREMENTS
Interest Rate Products, Intra-Commodity Spreads

FIG. 4A

Eurodollar (ED) - Tier 4 vs. Tier 4 [Months 13-16 vs. Months 13-16]

| Rate Type | Change | Current Initial | Current Maintenance | New Initial | New Maintenance |
|---|---|---|---|---|---|
| Intra-Commodity Spread – Spec | Decrease | $237 | $175 | $135 | $100 |
| Intra-Commodity Spread – Hedge | Decrease | $175 | $175 | $100 | $100 |
| Intra-Commodity Spread – Member | Decrease | $175 | $175 | $100 | $100 |

Eurodollar (ED) - Tier 4 vs. Tier 5 [Months 13-16 vs. Months 17-20]

| Rate Type | Change | Current Initial | Current Maintenance | New Initial | New Maintenance |
|---|---|---|---|---|---|
| Intra-Commodity Spread – Spec | Decrease | $304 | $225 | $203 | $150 |
| Intra-Commodity Spread – Hedge | Decrease | $225 | $225 | $150 | $150 |
| Intra-Commodity Spread – Member | Decrease | $225 | $225 | $150 | $150 |

Eurodollar (ED) - Tier 4 vs. Tier 6 [Months 13-16 vs. Months 21-24]

| Rate Type | Change | Current Initial | Current Maintenance | New Initial | New Maintenance |
|---|---|---|---|---|---|
| Intra-Commodity Spread – Spec | Decrease | $372 | $275 | $270 | $200 |
| Intra-Commodity Spread – Hedge | Decrease | $275 | $275 | $200 | $200 |
| Intra-Commodity Spread – Member | Decrease | $275 | $275 | $200 | $200 |

Eurodollar (ED) - Tier 4 vs. Tier 7 [Months 13-16 vs. Months 25-28]

| Rate Type | Change | Current Initial | Current Maintenance | New Initial | New Maintenance |
|---|---|---|---|---|---|
| Intra-Commodity Spread – Spec | Decrease | $405 | $300 | $304 | $225 |
| Intra-Commodity Spread – Hedge | Decrease | $300 | $300 | $225 | $225 |
| Intra-Commodity Spread – Member | Decrease | $300 | $300 | $225 | $225 |

Eurodollar (ED) - Tier 4 vs. Tier 8 [Months 13-16 vs. Months 29-32] FIG. 4B

| Rate Type | Change | Current Initial | Current Maintenance | New Initial | New Maintenance |
|---|---|---|---|---|---|
| Intra-Commodity Spread – Spec | Decrease | $473 | $350 | $405 | $300 |
| Intra-Commodity Spread – Hedge | Decrease | $350 | $350 | $300 | $300 |
| Intra-Commodity Spread – Member | Decrease | $350 | $350 | $300 | $300 |

Eurodollar (ED) - Tier 4 vs. Tier 9 [Months 13-16 vs. Months 33-36]

| Rate Type | Change | Current Initial | Current Maintenance | New Initial | New Maintenance |
|---|---|---|---|---|---|
| Intra-Commodity Spread – Spec | Decrease | $540 | $400 | $473 | $350 |
| Intra-Commodity Spread – Hedge | Decrease | $400 | $400 | $350 | $350 |
| Intra-Commodity Spread – Member | Decrease | $400 | $400 | $350 | $350 |

Eurodollar (ED) - Tier 4 vs. Tier 10 [Months 13-16 vs. Months 37-40]

| Rate Type | Change | Current Initial | Current Maintenance | New Initial | New Maintenance |
|---|---|---|---|---|---|
| Intra-Commodity Spread – Spec | Decrease | $642 | $475 | $574 | $425 |
| Intra-Commodity Spread – Hedge | Decrease | $475 | $475 | $425 | $425 |
| Intra-Commodity Spread – Member | Decrease | $475 | $475 | $425 | $425 |

Eurodollar (ED) - Tier 4 vs. Tier 11 [Months 13-16 vs. Months 41-44]

| Rate Type | Change | Current Initial | Current Maintenance | New Initial | New Maintenance |
|---|---|---|---|---|---|
| Intra-Commodity Spread – Spec | Decrease | $743 | $550 | $675 | $500 |
| Intra-Commodity Spread – Hedge | Decrease | $550 | $550 | $500 | $500 |
| Intra-Commodity Spread – Member | Decrease | $550 | $550 | $500 | $500 |

SYSTEM AND METHOD FOR ACTIVITY BASED MARGINING

REFERENCE TO RELATED APPLICATIONS

This application in a continuation application of U.S. patent application Ser. No. 12/815,013, filed Jun. 14, 2010, now U.S. Pat. No. 7,996,302 which is a continuation of U.S. patent application Ser. No. 11/030,815, filed Jan. 7, 2005, now U.S. Pat. No. 7,769,667 which is hereby incorporated by reference in its entirety. This application claims the benefit of the filing date under 35 U.S.C. §119(e) of U.S. Provisional Application Ser. No. 60/608,787 filed Sep. 10, 2004, which is hereby incorporated by reference in its entirety.

The following co-pending and commonly assigned U.S. patent application has been filed on the same date as U.S. patent application Ser. No. 11/030,815. This application relates to and further describes other aspects of the embodiments disclosed in the present application and is herein incorporated by reference.

U.S. patent application Ser. No. 11/030,796, "SYSTEM AND METHOD FOR EFFICIENTLY USING COLLATERAL FOR RISK OFFSET", now U.S. Pat. No. 7,426,487.

U.S. patent application Ser. No. 11/030,833, "SYSTEM AND METHOD FOR ASYMMETRIC OFFSETS IN A RISK MANAGEMENT SYSTEM", now U.S. Pat. No. 7,509,275.

U.S. patent application Ser. No. 11/030,814, "SYSTEM AND METHOD FOR DISPLAYING A COMBINED TRADING AND RISK MANAGEMENT GUI DISPLAY".

U.S. patent application Ser. No. 11/031,182, "SYSTEM AND METHOD FOR FLEXIBLE SPREAD PARTICIPATION", now U.S. Pat. No. 7,593,877.

U.S. patent application Ser. No. 11/030,869, "SYSTEM AND METHOD FOR HYBRID SPREADING FOR RISK MANAGEMENT", now U.S. Pat. No. 7,428,508.

U.S. patent application Ser. No. 11/030,849, "SYSTEM AND METHOD OF MARGINING FIXED PAYOFF PRODUCTS", now U.S. Pat. No. 7,430,539.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Futures Exchanges, referred to herein also as an "Exchange", such as the Chicago Mercantile Exchange Inc. (CME), provide a marketplace where futures and options on futures are traded. Futures is a term used to designate all contracts covering the purchase and sale of financial instruments or physical commodities for future delivery on a commodity futures exchange. A futures contract is a legally binding agreement to buy or sell a commodity at a specified price at a predetermined future time. Each futures contract is standardized and specifies commodity, quality, quantity, delivery date and settlement. An option is the right, but not the obligation, to sell or buy the underlying instrument (in this case, a futures contract) at a specified price within a specified time. In particular, a put option is an option granting the right, but not the obligation, to sell a futures contract at the stated price prior to the expiration date. In contrast, a call option is an option contract which gives the buyer the right, but not the obligation, to purchase a specific futures contract at a fixed price (strike price) within a specified period of time as designated by the Exchange in its contract specifications. The buyer has the right to buy the commodity (underlying futures contract) or enter a long position, i.e. a position in which the trader has bought a futures contract that does not offset a previously established short position. A call writer (seller) has the obligation to sell the commodity (or enter a short position, i.e. the opposite of a long position) at a fixed price (strike price) during a certain fixed time when assigned to do so by the Clearing House. The term "short" refers to one who has sold a futures contract to establish a market position and who has not yet closed out this position through an offsetting procedure, i.e. the opposite of long. Generally, an offset refers to taking a second futures or options on futures position opposite to the initial or opening position, e.g. selling if one has bought, or buying if one has sold.

Typically, the Exchange provides a "clearing house" which is a division of the Exchange through which all trades made must be confirmed, matched and settled each day until offset or delivered. The clearing house is an adjunct to the Exchange responsible for settling trading accounts, clearing trades, collecting and maintaining performance bond funds, regulating delivery and reporting trading data. Clearing is the procedure through which the Clearing House becomes buyer to each seller of a futures contract, and seller to each buyer, and assumes responsibility for protecting buyers and sellers from financial loss by assuring performance on each contract. This is effected through the clearing process, whereby transactions are matched. A clearing member is a firm qualified to clear trades through the Clearing House. In the case of the CME's clearing house, all clearing members not specifically designated as Class B members are considered Class A clearing members. In the CME there are three categories of clearing members: 1) CME clearing members, qualified to clear transactions for all commodities; 2) IMM clearing members, qualified to clear trades for only IMM and TOM commodities; and 3) IMM Class B clearing members, solely limited to conducting proprietary arbitrage in foreign currencies between a single Exchange-approved bank and the IMM and who must be guaranteed by one or more Class A non-bank CME or IMM clearing member(s). Note that a "member" is a broker/trader registered with the Exchange.

While the disclosed embodiments will be described in reference to the CME, it will be appreciated that these embodiments are applicable to any Exchange, including those which trade in equities and other securities. The CME Clearing House clears, settles and guarantees all matched transactions in CME contracts occurring through its facilities. In addition, the CME Clearing House establishes and monitors financial requirements for clearing members and conveys certain clearing privileges in conjunction with the relevant exchange markets.

The Clearing House establishes clearing level performance bonds (margins) for all CME products and establishes minimum performance bond requirements for customers of CME products. A performance bond, also referred to as a margin, is the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The accounts of individual members, clearing firms and non-member customers doing business through CME must be carried and guaranteed to the Clearing House by a clearing member. As mentioned above, in every matched transaction executed through the Exchange's facilities, the Clearing House is substituted as the buyer to the seller and the seller to the buyer, with a clearing member assuming the opposite side of each transaction. The Clearing House is an operating division of the Exchange, and all rights, obligations and/or liabilities of the Clearing House are rights, obligations and/or liabilities of CME. Clearing members assume full financial and performance responsibility for all transactions executed through them and all positions they carry. The Clearing House, dealing exclusively with clearing members, holds each clearing member accountable for every position it carries regardless of whether the position is being carried for the account of an individual member, for the account of a non-member customer, or for the clearing member's own account. Conversely, as the contra-side to every position, the Clearing House is held accountable to the clearing members for the net settlement from all transactions on which it has been substituted as provided in the Rules.

The Clearing House does not look to non-member customers for performance or attempt to evaluate their creditworthiness or market qualifications. The Clearing House does monitor clearing members for the adequacy of credit monitoring and risk management of their customers. In addition, although the Exchange has established character and financial standards for its individual members, the Clearing House looks solely to the clearing member carrying and guaranteeing the account to secure all payments and performance bond obligations. Further, when an individual member executes orders for a clearing member, his or her guarantor clearing member is held accountable as principal for the brokered transaction until the transaction has been matched and recorded by the Clearing House as a transaction of the clearing member for whom the individual member had acted.

The risk management and financial surveillance techniques employed by CME are designed to:
Prevent the accumulation of losses;
Ensure that sufficient resources are available to cover future obligations;
Result in the prompt detection of financial and operational weaknesses;
Allow swift and appropriate action to be taken to rectify any financial problems and protect the clearing system.
These techniques are consistent with risk management recommendations by authoritative organizations.

CME derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. Debt obligations from option contracts are also immediately removed, since the purchaser of an option must pay the premium (cost of the option) in full at the time of purchase. Sellers of options post performance bonds, discussed above, as determined by the CME according to the prevailing risk characteristics of the options sold. In the case of the CME, each business day by 6:40 a.m. Chicago time, based on the mark-to-the-market of all open positions to the previous trading day's settlement price, the Clearing House pays to or collects cash from each clearing member. This cash flow, known as settlement variation, is performed by CME's settlement banks based on instructions issued by the Clearing House. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the Clearing House has the authority to perform additional intra-day mark-to-the-market calculations on open positions and to call for immediate payment of settlement variation. Settlement variation payments through the Clearing House average $1.4 billion per day and have reached a peak of $6.4 billion. CME's mark-to-the-market settlement system stands in direct contrast to the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

If a clearing member does not have sufficient performance bond collateral on deposit with the Clearing House, then the clearing member must meet a call for cash performance bond deposits by 6:40 a.m. and/or by 2:00 p.m. Chicago time, which results in a direct debit to the clearing member's account at one of CME's settlement banks. Clearing members' performance bond deposits may only be:
Cash (such as U.S. dollars, Japanese yen, Euro currency, Swiss francs, British pounds, Canadian dollars, Australian dollars, Norwegian krone, and Swedish krona);
U.S. Treasury securities;
Letters of credit issued in the Exchange's name by approved banks;
Stocks selected from among approximately half of those in the Standard & Poor's 500® Stock Price Index and depository trust shares based on the Standard & Poor's 500 Stock Price Index;
Selected sovereign debt of Canada, France, Germany, and the UK;
Discount notes issued by the Federal Farm Credit Banks, Federal Home Loan Mortgage Corporation, Federal Home Loan Bank System, or Fannie Mae, provided that the notes have less than six months remaining to maturity;

Fixed rate note and bond securities issued by the Federal Farm Credit Bank, Federal Home Loan Bank, Federal Home Loan Mortgage Corporation, Fannie Mae or Ginnie Mae;

Interest Earning Facility (IEFÒ), a CME managed fund program;

IEF2: Money Market Mutual Funds allowable under CFTC Regulation 1.25; and

IEF3 and IEF4: Clearing firm self-directed collateral management program, which allows collateral instruments allowable permitted under CFTC Regulation 1.25.

Securities are revalued every day and are subject to prudent haircuts. Additionally, foreign cash is subject to haircuts in selected circumstances. Various forms of collateral are also subject to limits.

CME's Clearing House also maintains a Concentration Margining Program, which allows the Clearing House to charge additional performance bond requirements when clearing firms' potential market exposures become large relative to the financial resources available to support those exposures.

In recognition of the growing linkages among the markets for exchange-traded equity derivative products, as well as the need to promote efficient clearing procedures and to focus on the true intermarket risk exposure of clearing members, CME, in conjunction with the Options Clearing Corporation (OCC) and the New York Clearing Corporation (NYCC), has developed a cross-margining system with respect to market professionals and proprietary accounts. By combining the positions of joint or affiliated clearing members in certain broad-based equity index futures and options into a single portfolio, and utilizing the sophisticated risk-based systems of each clearing organization, a single performance bond requirement across both markets is determined. The clearing organizations jointly hold a first lien on and security interest in the positions in cross-margined accounts. All performance bond deposits associated with these accounts are jointly held. The cross-margining system significantly enhances both the efficiency and financial integrity of the clearing system by treating all positions as being held in the same account, which allows gains accruing to futures or options positions to be immediately available to meet the requirements for funds from losing positions. In the event that a clearing organization suspends a cross-margining member, the positions in the cross-margin accounts would be liquidated and all performance bond collateral would be converted to cash and applied toward each clearing organization's costs of liquidating the cross-margin accounts. CME, the OCC and the NYCC are each entitled to proportional shares of any surplus to apply toward other obligations of the clearing member; if one clearing organization did not need its entire share of the surplus, the excess would be made available to the other clearing organizations.

CME also maintains cross-margin agreements with the London Clearing House and Fixed Income Clearing Corporation. These programs involve the cross-margining of selected interest rate products. The design of these two cross-margin programs differ from the above mentioned OCC/NYCC program in that performance bond collateral is held separately at each respective clearing organization. In the event that a clearing organization suspends a CME/LCH cross-margining participant, the cross-margined positions would be liquidated and performance bond collateral would be converted to cash at each respective clearing organization. If as a result of the liquidation of cross-margined positions and performance bond there is a resulting cross-margin loss, there will be a cross-margin guarantee payment from one clearing organization to the other to share the loss. A similarly structured cross-margin program is in place between CME and NYMEX for NYMEX energy products versus CME's commodity index complex.

The Clearing House Division monitors intra-day price movements throughout the trading session. To assess the impact of these price changes on clearing members, an intra-day mark-to-the-market calculation is performed on clearing member futures and options positions and reviewed by the Clearing House and Risk Management Departments several times each day, more frequently if price volatility is high. Large or concentrated positions on the losing side of the market receive special attention. The Audit Department may either contact or visit a clearing firm to determine whether proper performance bonds have been collected for these positions and to determine their impact on the clearing member's capital position and liquidity.

CME also conducts stress testing of clearing member positions on a daily basis. Numerous stress scenarios have been modeled to reflect a diverse universe of possible market events. Stress results are evaluated against performance bond on deposit and also with clearing member adjusted net capital. Results of stress tests may lead the Clearing House to request that the clearing member provide additional information about its customer accounts such as whether there are non-CME offsetting positions in other markets. In some cases stress test results may cause the Clearing House to increase a clearing member's performance bond requirement, or reduce or transfer positions.

Through the Division of Market Regulation at CME and working in conjunction with CBOT's Office of Investigations and Audits (OIA), CME's Risk Management Team has daily access to specific account position information regarding individual members, nonmember customers and clearing members, all of which is maintained on a highly confidential basis. Such critical information allows the identification of concentrated positions as they arise and the aggregation of positions that may be owned by common principals through several different clearing members. Knowledge of concentrated or high-risk positions, coupled with information routinely gathered on the cash and/or related derivative markets, enables CME to respond rapidly to market situations that might adversely affect the clearing system and/or the financial stability of a clearing member.

The Exchanges periodically visit their clearing member firms to review their financial, operational and risk management procedures and capabilities. Senior Clearing House staff evaluate how well each firm's procedures and capabilities correspond to its line of business. Senior staff from Audit, Clearing House, Risk Management, and Market Regulation follow up with the clearing member's senior management if there are deficiencies found in their risk management procedures and capabilities.

Risk management and financial surveillance are the two primary functions of CME's financial safeguard system. The system is designed to provide the highest level of safety and the early detection of unsound financial practices on the part of any clearing member. Its purpose is to protect all clearing members and their customers from the consequences of a default by a participant in the clearing process. The system is constantly being updated to reflect the most advanced risk management and financial surveillance techniques.

In order to minimize risk to the Exchange while minimizing the burden on members, it is desirable to approximate the requisite performance bond or margin requirement as closely as possible to the actual positions of the account at any given time. Accordingly, there is a need to improve the accuracy and flexibility of the mechanisms which estimate performance bond requirements.

BRIEF DESCRIPTION OF THE DRAWINGS

FIGS. 4A-4B depict exemplary performance bond requirements.

DETAILED DESCRIPTION OF THE DRAWINGS AND PRESENTLY PREFERRED EMBODIMENTS

Figure 1:
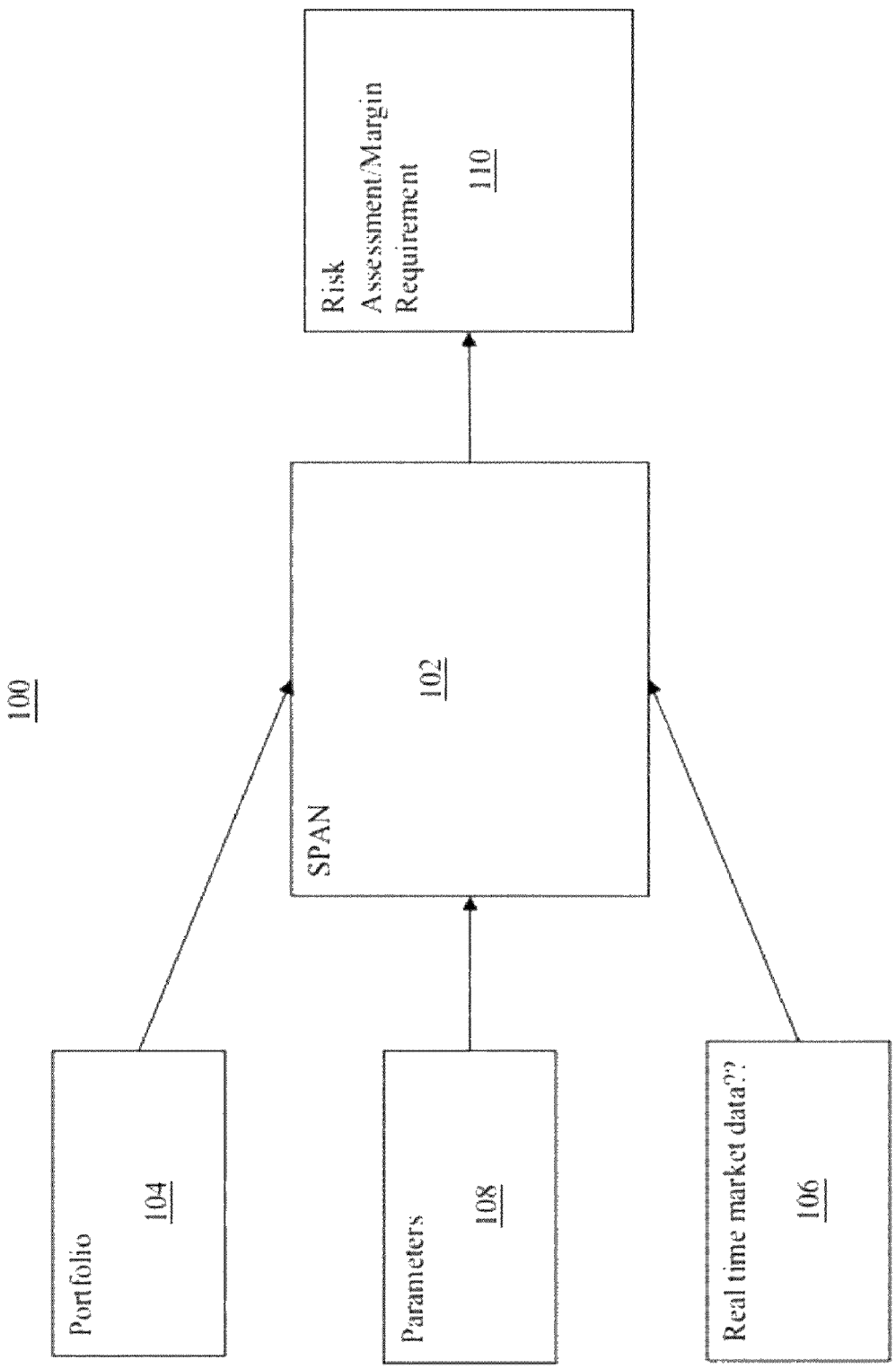
FIG. 1 depicts an exemplary risk management system according to one embodiment.

CME establishes minimum initial and maintenance performance bond levels for all products traded through its facilities. CME bases these requirements on historical price volatilities, current and anticipated market conditions, and other relevant information. Performance bond levels vary by product and are adjusted to reflect changes in price volatility and other factors. Both initial and maintenance performance bonds are good faith deposits to guarantee performance on futures and options contracts. Maintenance performance bond levels represent the minimum amount of protection against potential losses at which the Exchange will allow a clearing member to carry a position or portfolio. Should performance bonds on deposit at the customer level fall below the maintenance level, Exchange rules require that the account be re-margined at the required higher initial performance bond level. Clearing members may impose more stringent performance bond requirements than the minimums set by the Exchanges. At the Clearing House level, clearing members must post at least the maintenance performance bonds for all positions carried. This requirement applies to positions of individual members, nonmember customers and the clearing member itself.

In setting performance bond levels, the Clearing House monitors current and historical price movements covering short-, intermediate- and longer-term data using statistical and parametric and non-parametric analysis. The Clearing House and CME Board of Directors then typically set futures maintenance performance bond levels to cover at least the maximum one-day price move on 95% of the days during these time periods. The actual performance bond requirements often exceed this level. Performance bond requirements for options reflect movements in the underlying futures price, volatility, time to expiration and other risk factors, and adjust automatically each day to reflect the unique and changing risk characteristics of each option series. In addition, long options must be paid for in full, and CME mandates stringent minimum performance bonds for short option positions. Exemplar performance bond requirements are shown in FIGS. 4A-4B.

CME calculates performance bonds using a system developed and implemented by CME called Standard Portfolio Analysis of Risk™ (SPAN®). SPAN bases performance bond requirements on the overall risk of the portfolios using parameters as determined by CME's Board of Directors, and thus represents a significant improvement over other performance bond systems, most notably those that are "strategy-based" or "delta-based." Delta is the measure of the price-change relationship between an option and the underlying futures price and is equal to the change in premium divided by the change in futures price. SPAN simulates the effects of changing market conditions and uses standard options pricing models to determine a portfolio's overall risk. It treats futures and options uniformly while recognizing the unique features of options. In standard options pricing models, three factors most strongly affect options values: the underlying futures price, volatility (variability of futures price) and time to expiration. As these factors change, futures and options may gain or lose value. SPAN constructs scenarios of futures prices and volatility changes to simulate what the entire portfolio might reasonably lose over a one day time horizon. The resulting SPAN performance bond requirement covers this potential loss.

SPAN evaluates overall portfolio risk by calculating the worst probable loss that a portfolio might reasonably incur over a specified time period. SPAN achieves this number by comparing hypothetical gains and losses that a portfolio would sustain under different market conditions. SPAN typically provides a "Risk Array" analysis of 16 possible scenarios for a specific portfolio under various conditions. SPAN methodology, however, allows users to request any number of scenarios to meet their particular needs:

Each scenario consists of a "what-if" situation in which SPAN assesses the effects of variations in price, volatility and time to expiration; and Each calculation represents a gain or loss based on the possible gains or losses due to changes in an instrument's price by X and volatility by Y.

SPAN licensed clearing organizations and exchanges determine for themselves the following SPAN parameters, in order to reflect the risk coverage desired in any particular market:

Price Scan Range: A set range of potential price changes;

Volatility Scan Range: A set range of potential implied volatility changes;

Intra commodity Spread Charge: An amount that accounts for risk (basis risk) of calendar spreads or different expirations of the same product, which are not perfectly correlated;

Short Option Minimum: Minimum margin requirement for short option positions;

Spot Charge: A charge that covers the increased risk of positions in deliverable instruments near expiration; and Intercommodity Spread Credit: Margin credit for offsetting positions between correlated products.

SPAN combines financial instruments within the same underlying for analysis, and refers to this grouping as the Combined Commodity group. For example, futures, options on futures and options on equities on the same stock could all be grouped under a single Combined Commodity.

To calculate a performance bond requirement, for each Combined Commodity in a portfolio, SPAN will:

Sum the Scan Risk charges, any Intracommodity Spread and Spot Charges;

Apply the offsets for all Intercommodity Spread Credits within the portfolio;

Compare the above sum with any existing Short Option Minimum requirement; and

Assess the greater of the two compared as the risk of the Combined Commodity.

The Total Margin Requirement for a portfolio is the sum of the risk of all Combined Commodities less all credit for risk offsets between the different Combined Commodities.

Here's an example of a portfolio with CME Euro FX Futures and Options positions:
Euro FX Futures: 1 Long June O4
Euro FX Options on Futures: 1 Short June/JuneO4 Call 1.150 Strike
Euro FX June Futures Settlements 1.1960
Euro FX Futures Price Scan Range=$2400=192 points
Euro FX Volatility Scan Range=1%

| # | One Long June 04 Euro FX | One Short June on June 04 1.150 Call Euro FX Option | Portfolio | Scenario Description |
|---|---|---|---|---|
| 1 | $0 | −$130 | −$130 | Price unchanged; Volatility up the Scan Range. |
| 2 | $0 | $155 | $155 | Price unchanged; Volatility down the Scan Range |
| 3 | $800 | −$785 | $15 | Price up 1/3 the Price Scan Range; Volatility vp the Scan Range |
| 4 | $800 | −$531 | $268 | Price up 113 the Price Scan Range; Volatility down the Scan Range |
| 5 | .$800 | $500 | $300 | Price down 113 the Price Scan Range; Volatility up the Scan Range |
| 6 | −$800 | $815 | $15 | Price down the 1/3the Price Scan Range; Volatility down the Scan Range |
| 7 | $1600 | −$1463 | $137 | Price up 2/3 the Price Scan Range; Volatility up the Scan Range |
| 8 | $1600 | -$1240 | $360 | Price up 2/3 the Price Scan Range; Volatility down the Scan Range |
| 9 | −$1600 | $1102 | −$498 | Price down 2/3the Price Scan Range; Volatility up the Scan Range |
| 10 | −$1600 | $1446 | −$154 | Price down 2/3the Price Scan Range; Volatility down the Scan Range |
| 11 | $2400 | −$2160 | $240 | Price up 3/3 the Price Scan Range; Volatility down the Scan Range |
| 12 | $2400 | $1967 | $433 | Price down 3/3 the Price Scan Range; Volatility down the Scan Range |
| 13 | −$2400 | $1674 | −$726 | Price down the Price Scan Range; Volatility up the Scan Range |
| 14 | −$2400 | $2043 | −$357 | Price down 3/3 the Price Scan Range; Volatility down the Scan Range |
| 15 | $2304 | −$2112 | $192 | Price up extreme (3 times the Price Scan Range)- Cover 32% of loon |
| 16 | −$2304 | $1466 | −$838 | Price down extreme (3 times the Price Scan Range)- Cover 32% of loss |

In the sample portfolio above, in scenario 8, the gain on one long June 04 EC futures position offsets the loss of one short EC June/June 04 1.150 call option position, incurring a gain of $360. In scenario 16, the portfolio would incur a loss of $838 over the next trading day, which is 32% of the resulting loss if the price of the underlying future decreases by three times the price scan range. After SPAN has scanned the different scenarios of underlying market price and volatility changes, it selects the largest loss among these observations. This "largest reasonable loss" is the Scan Risk charge. In this example, the largest loss across all 16 scenarios is a result of Scenario 16, a loss of $838.

A number of common features are integrated into the SPAN software family. All SPAN software products:
  Are Windows-based and have the familiar look and feel of today's most widely used desktop software products;
  Feature free access to daily SPAN arrays from a variety of exchanges and clearing organizations around the world;
  Feature extensive, detailed and well-documented reports on Portfolio and Risk parameters;
  Include an XML-based reporting module which provides for simple data import and export to Access or Excel;
  Are supported by the CME Clearing House's Risk Management experts via a dedicated SPAN hot/me and email address;
  Run in batch or GUI interactive mode and can be automated with simple scripting language; and
  Support multiple currencies and the widest possible variety of instruments including stocks, bonds, OTC derivatives, cash, futures, and options.

PC-SPAN is single-user desktop software that enables a user to enter positions manually or by using scripting language to automate the position entry process. With a click of the mouse, the SPAN requirement is known. As thousands of users can attest, PC-SPAN allows for an extremely quick, inexpensive and simple way to calculate margin requirements across multiple exchanges.

The Span Risk Manager is a single-user, desktop software that integrates risk management features with the latest processing technology to deliver an extremely flexible, intuitive system for full portfolio risk management. Span Risk Manager's powerful features and intuitive design allow for true portfolio analytics through multi-variant stress testing and option exposures.

Specifically, SPAN Risk Manager:
Enables users to gauge the effects, on a total portfolio or an individual option, of:
  Changes in price
  Implied volatility
  Time to expiration
  Dividend yields
  Interest rates
Calculates hypothetical P&L's, option prices, and Greeks
Calculates implied, average call/put and series volatilities
Allows for stress testing of multiple products
Allows user to define, compare, save and reload "What-If" Scenarios for stress testing
Enables the user to shift volatility skews
Provides simultaneous analyses on several different trading instruments
Supports the following option pricing models:
  Black-Scholes
  Merton
  Adesi-Whaley
  Cox-Ross-Rubenstein At the top of the SPAN software hierarchy is SPAN Risk Manager Clearing. This program employs all of the functionalities of PC-SPAN and SPAN Risk Manager plus several additional features which are applicable to entities such as exchanges, clearing organizations, and service bureaus. These features include:

"What-If" Margining—Allows an organization to view and compare hypothetical margins under multi-variant "What-if" scenarios;

Real-Time Component Interface—Allows for real-time SPAN margining and pro or post execution credit controls;

Automated Production and Publication of SPAN Risk Array files—Takes the work out of creating a publishing a daily SPAN Risk Array file to the world; and Complex Implied Volatility Averaging.

As described above, SPAN is utilized by both the Exchange and is also provided as a tool which may be used by clearing members or other entities to determine their anticipated performance bond requirements. In this way, clearing members, or other entities, may anticipate the performance bond requirements of the clearing house which facilitates financial planning and certainty. SPAN is also made available as a product to be used by clearing houses of other exchanges. It will be appreciated that the disclosed embodiments are equally applicable to both the version of SPAN used by the exchange and the version used by the market participants and that any discussion herein referring to SPAN is intended to be applicable to both applications.

Another system for assessing risk in a portfolio is the Theoretical Intermarket Margin System ("TIMS") manufactured by The Options Clearing Corporation, located in Chicago, Ill. TIMS allows clearing institutions to measure, monitor and manage the level of risk exposure of their members' portfolios. TIMS can calculate risk exposure at different account levels and for different account types. In addition, TIMS uses portfolio theory to margin all positions relating to the same underlying product and combines the risk of closely related products into integrated portfolios. This portfolio aspect of TIMS allows for the recognition of hedges used by market participants in increasingly interrelated markets. The TIMS methodology allows for measuring the monetary risk inherent in portfolios containing options, futures and options on futures positions.

In particular, TIMS uses pricing models to project the liquidation value of each portfolio given changes in the price of each underlying product. These models generate a set of theoretical values based on various factors including current prices, historical prices and market volatility. Based on flexible criteria established by a clearinghouse, statistically significant hedges receive appropriate margin offsets. TIMS also is used to predict a member's potential intra-day risk under varying sets of assumptions regarding market behavior.

TIMS organizes all classes of options and futures relating to the same underlying asset into class groups and all class groups whose underlying assets exhibit close price correlation into product groups. The daily margin requirement for a clearing member is calculated based on its entire position within a class group and various product groups. The margin requirement consists of two components, a mark to market component and an additional margin component.

The mark to market component takes the form of a premium margin calculation that provides margin debits or requirements for net short positions and margin credits for net long positions. The margin debits and credits are netted to determine the total premium margin requirement or credit for each class group. The premium margin component represents the cost to liquidate the portfolio at current prices by selling the net long positions and buying back the net short positions.

The additional margin component, the portion of the margin requirement that covers market risk, is calculated using price theory in conjunction with class group margin intervals. TIMS projects the theoretical cost of liquidating a portfolio of positions in the event of an assumed worst case change in the price of the underlying asset. Theoretical values are used to determine what a position will be worth when the underlying asset value changes. Given a set of input parameters (i.e., option contract specifics, interest rates, dividends and volatility), the pricing model will predict what the position should theoretically be worth at a specified price for the underlying instrument.

The class group margin interval determines the maximum one day increase in the value of the underlying asset (upside) and the maximum one day decrease in the value of the underlying asset (downside) that can be expected as a result of historical volatility. The methodology used to determine class group margin intervals and product groups can be specified by each clearing institution. OCC's methodology for determining class group margin intervals is based on ongoing statistical analysis. For each class group, the standard deviation is computed and a margin interval is calculated which covers a predetermined percentage specified by the clearinghouse. This approach provides both a confidence level and historical perspective on volatility and accounts for any non-normal price distribution patterns. TIMS also calculates theoretical values at equal intervals between the two endpoints (upside and downside) and at the current market value to protect against certain trading strategies that may have their largest loss between these two endpoints.

The methodology for determining which class groups comprise a product group and the appropriate percentage deduction to account for the lack of perfect correlation between class groups is also based on ongoing statistical analysis. For each pair of class groups, TIMS computes a coefficient of determination. TIMS assigns class groups to a product group when the value of the coefficient between the class groups is within policy limits established by the clearinghouse. The product group percentage or offset is established based on the lowest coefficient of determination among all of the class groups included in the product group. When calculating an account's total margin requirement, this specified percentage of any margin credits at the class group level is used to offset margin requirements generated by other class groups in the same product group.

Yet another risk management system is the OMS II system, also referred to as the "Window method" or the "Vector method". OMS II is the OM risk calculation method for calculating margin requirements. It is included in the risk valuation or RIVA system within OM SECUR. It was constructed in order to handle non-linear instruments in a better way than SPAN or TIMS. OMS II calculates worst case loss scenarios, store these in vectors, adjust for spreading, and adds the vectors in a way that takes correlation in to account.

In OMS II the valuation interval is divided into n (normally n=31) possible up or down moves, additionally for each up or down move the volatility can either increase stand still or decrease. This gives us 93 alternative market scenarios (if n=31) to calculate the profit or loss a portfolio will make.

The scenario with no price move at all is the middle scenario and around it there are 15 up and 15 down scenarios (or (n−1)/2 up and (n−1)/2 down scenarios).

TABLE

OMS valuation scenarios. (n = 31)

| | Underlying Price Scan Range | Volatility Scan Range |
|---|---|---|
| 1 | Price unchanged | Volatility down |
| 2 | Price unchanged | Volatility unchanged |
| 3 | Price unchanged | Volatility up |
| 4 | Price up 1/15 range | Volatility down |
| 5 | Price up 1/15 range | Volatility unchanged |
| 6 | Price up 1/15 range | Volatility up |
| 7 | Price down 1/15 range | Volatility down |
| 8 | Price down 1/15 range | Volatility unchanged |
| 9 | Price down 1/15 range | Volatility up |
| 10 | Price up 2/15 range | Volatility down |
| 11 | Price up 2/15 range | Volatility unchanged |
| 12 | Price up 2/15 range | Volatility up |
| 13 | Price down 2/15 range | Volatility down |
| 14 | Price down 2/15 range | Volatility unchanged |
| 15 | Price down 2/15 range | Volatility up |
| . | . | . |
| . | . | . |
| . | . | . |
| 88 | Price up 15/15 range | Volatility down |
| 89 | Price up 15/15 range | Volatility unchanged |
| 90 | Price up 15/15 range | Volatility up |
| 91 | Price down 15/15 range | Volatility down |
| 92 | Price down 15/15 range | Volatility unchanged |
| 93 | Price down 15/15 range | Volatility up |

As in both SPAN and TIMS, one can view OMS II mathematically as producing the maximum of the expected loss under each of 93 probability measures. For all 93 scenarios the probability measures are point masses at each of the 93 points in a space $\Omega$ of securities prices and volatilities.

Each valuation point is saved in a 31×3 matrix, that is, each row contains a price move and the three volatility fluctuations. The matrix is expanded to a 31×6 matrix so that the case of both a bought and a sold contract is represented in the matrix, this because of additional fine-tunings that are available in OMS II. The matrixes are saved for use when margin requirements of portfolios are calculated.

In the case of an account containing positions of two or more types of contracts the risk of the position is the combined risk characteristics of the different contracts registered to the account. To take the offsetting characteristics of the instrument into account one talks about cross margining. The default cross margining divides the positions into one group per underlying. Positions on instruments within the same underlying are said to be totally correlated. The default cross margin can be described as instruments with the same underlying being totally correlated and instruments with different underlying being uncorrelated. During a default cross-margin run a portfolio with instruments on the same underlying will add the valuation files pointwise as in SPAN and then take the largest negative value as the margin requirement for the portfolio6. If the portfolio consists of instruments on different underlyings the largest negative value of each valuation file will be added.

However, a method such as default cross margining does not take correlations between different underlyings or different expiry months into consideration. Therefore in OMS II one uses the so-called "Window method" when a portfolio containing instruments on different underlyings or contracts with different expiry months is margined.

In the window method, the different instruments are sorted into a number of groups, called window classes. The window classes have a window size defined in percent. When the percentage goes down the correlation goes up and vice versa, e.g. a window size of 0% means that the instruments in the window class are totally correlated and a window size of 100% means that the instruments in the window class are uncorrelated. There is also a possibility for a window class to be a member of another window class, and in such case creating a tree structure of more complicated correlations. To calculate the margin for a portfolio, the window is moved from left to the right over the entire valuation interval for all window classes, starting with the ones in the bottom of the tree. The window is centered over each valuation point. A margin requirement is calculated at each valuation point where the window is positioned by adding the lowest value for each option position or futures position shown in the window. The total margin requirement will be the largest negative value of all these margin requirements. If there is no negative value this indicates a credit and no margin is required.

The risk calculation part of OMS, without use of any fine-tunings, should also be a coherent risk measure, this since the calculations only differ in the amount of scenarios used. OMS uses far more scenarios then both SPAN and TIMS.

A comparison of SPAN, TIMS and OMS II may be found in Bylund, Mattias, "A Comparison of Margin Calculation Methods for Exchange Traded Contracts" (Feb. 21, 2002). Royal Institute of Technology Dept. of Mathematical Statistics, Master Thesis No. 2002-3. http://ssrn.com/abstract=300499, herein incorporated by reference. While the disclosed embodiments will be discussed with reference to the SPAN® risk analysis software, it will be appreciated that they may also be applicable to the TIMS risk analysis software, as well as other products directed at determining performance bond requirements and/or assessing risk in a portfolio of derivatives.

The CME Clearing House requires "gross" performance bonds for customer positions in CME products. The clearing member must deposit performance bonds for each open position (long or short) held at the end of each day's trading, with appropriate allowances for spreads. A spread is the price difference between two contracts, e.g., holding a long and a short position in two related futures or options on futures contract, with the objective of profiting from a changing price relationship or the assumption of a long and short position on the same business day in the same or related commodities for the same account. Long refers to one who has bought a futures or options on futures contract to establish a market position and who has not yet closed out this position through an offsetting procedure, e.g. one who has bought a futures or options contract to establish a market position; a market position which obligates the holder to take delivery; or one who owns an inventory of commodities. Long is the opposite of short.

A Spread order—Open Outcry: is an order that indicates the purchase and sale of futures contracts simultaneously. A Spread trade is the simultaneous purchase and sale of futures contracts for the same commodity or instrument for delivery in different months or in different but related markets. A spreader is not concerned with the direction in which the market moves, but only with the difference between the prices of each contract.

Spreads include Bear spreads, Bull Spreads, Butterfly spreads, Calendar spreads and user defined spreads. A Bear spread is a vertical spread involving the sale of the lower strike call and the purchase of the higher strike call, called a bear call spread. Also, a vertical spread involving the sale of the lower strike put and the purchase of the higher strike put, called a bear put spread. A Bull spread is a vertical spread involving the purchase of the lower strike call and the sale of the higher strike call, called a bull call spread. Also, a vertical spread involving the purchase of the lower strike put and the sale of the higher strike put, called a bull put spread. Butterfly spreads can be futures or options spreads. As an option spread, a Butterfly spread is a strategy combining a bull and bear spread and uses three strike prices. The strike price is the price at which the option buyer may purchase or sell the underlying futures contract upon exercise. The lower two strike prices are used in the bull spread and the higher strike price from the bear spread. Both puts and calls can be used. A Calendar spread, also known as a futures calendar spread or futures intra-delivery spread, is the simultaneous purchase and sale of the same futures contract, but for different contract months, for example, buying a September S&P 500Â® futures contract and selling a December S&P 500 futures contract. An options calendar spread is the simultaneous purchase and sale of options of the same strike, but different expiration dates. User defined spreads relate to the ability to choose the legs of a spread if the spread is not identified by Exchange already.

In general, the purchase or sale of a futures contract is considered to be an outright long or short position. However, another strategy known as spread trading is also available to the hedger and speculator. Spread trading involves the simultaneous purchase of one commodity contract against the sale of another related contract. Natural spread opportunities are available in the energy market between different months of the same commodity contract, as well as between different products and grades. Some players confine themselves to trading outright futures and options contracts, leaving the enormous potential of the spread markets untapped. This is primarily due to the misconception that spreads are inherently more complex than outright positions. While there can be additional risk holding both long and short positions in different commodity contracts, it is generally accepted that having a position off-set by an equal but opposite position in another commodity contract should lessen one's risk. This is reflected by the fact that spread positions are less costly to margin than outright positions. The hedger can benefit from the spread market as well. If spread values are closely monitored, they can provide valuable information as to when and where a hedge should be placed.

There are four basic types of spreads. Though the most commonly traded is the intramarket spread, they are all consistently played in the oil market.

1. Intramarket Spreads: This spread consists of a long position in one contract month against a short position in another contract month in the same commodity. For example: Buy April Crude Oil—Sell May Crude Oil on the NYMEX.
2. Intermarket Spread: These spreads feature similar or related commodities on different exchanges. For example: Buy April IPE Gas oil—Sell April NYMEX Heating oil or Buy April IPE Brent—Sell April NYMEX Crude oil. Strictly interpreted, this definition is confusing when applied to the oil market, because spreads between different commodities on the same exchange are sometimes thought of as intermarket spreads.
3. Intercommodity Spreads: These spreads are comprised of a long position in one commodity, and a short position in a different but economically related commodity. For example: Buy April Gasoline—Sell April Heating oil.
4. Commodity-Product Spreads: This can be defined as the purchase of a commodity against the sale of an equivalent amount of the product derived from it (or vice versa). In the oil market, this is referred to as a "crack spread." For example: Buy 3 September Crude oil—Sell 2 September Gasoline+Sell 1 September Heating oil.

In theory, spread transaction is established in expectation that the differential between contacts will widen or narrow. Each side of the spread is referred to as a "leg." If the trader buys the higher, more valuable leg of the spread, he anticipates that the differential will widen. Conversely, if he sells the higher leg, he believes it will narrow. Whether the trader is long or short the spread depends upon what he has done to the more valuable (premium) leg. This holds true regardless of whether the market is at a carry or a discount.

For example: Assume November Crude oil is trading at $14.00, and December Crude oil is at $14.25. The trader buys the premium leg—December, in belief that the 0.25 cent spread will widen (while simultaneously selling the November).

As the market gains in strength, November moves to $14.75, and December to $15.50. To calculate the profit or loss, simply examine the profit or loss on each leg, and then the net result. In this example, the trader has lost 75 cents on the short leg—but has made $1.25 on the long leg. The result is a 50 cent net profit. Stated another way, the spread has widened from 25 cents to a 75 cent differential. It is important to note that the movement of the spread value is dependent upon the movement of the individual legs.

Spreading in Practice—Spread orders are normally placed by specifying the amount of difference between the two contracts of the spread, not the price level of each contract. Without this latitude spread orders would be impossible to fill because of the unlikelihood that both contracts would be at those exact prices at the same moment. The two most common types of spread orders are "market" and "limit." The market order would be the logical choice when spread values are unwavering and prompt execution is desired. If spread values are volatile, specific limits on the differential should be stated. The simplest type of spread order to execute is the one between two months of the same commodity. In this case, values are easy to determine because they are quoted in the same trading pit, much like an outright contract. Spreads between different commodities or exchanges are usually more difficult to execute. It should be noted that it is rarely advisable to place or liquidate spreads one side at a time. This practice of "legging" spreads can quickly turn a profitable trade into a loser. One should also avoid playing spreads involving the nearest expiring contract unless there is substantial liquidity remaining. A lack of liquidity can increase the potential for loss, as it may mitigate or exaggerate spread differentials. To determine the liquidity of a contract, simply compare the open interest to that of the other contracts.

Basic Spread Strategies—A trader uses the same skills to determine the potential of a spread as he would an outright position. Both technical and fundamental factors may influence his decision to buy or sell a spread. Consequently, the technical relationship between potential contracts are weighed along with the effects of supply and demand. There is no general rule that says that a spread will offer greater profit potential than an outright position, nor will it always be less risky. However, careful development of spread techniques can often translate into large profits.

Carrying Charge Strategies—Since oil is a non-perishable commodity, the maximum premium that the distant months may sell over the nearby month for a prolonged period is limited to the cost of carry. If full carrying costs are evident, very little risk, other than that created by changes in interest rates, is involved if your company sells the spread (long the nearby—short the differed, in an ascending market). Widening of the spread, which would create losses, is limited, while there is no limit to the amount that the nearby can run over the backs. In a carrying charge market, selling the nearby month and buying the distant, is usually not desirable. In that instance, the profit would be limited to full carrying charges, and the loss could be unlimited.

Inverted Market Strategies—The fact that the oil markets are often inverted (with the nearby month at a premium to the distant months) presents interesting challenges to the spread trader. It is still possible to profit if changes in differentials can be predicted. In a discount or inverted market, if one expects the discount to become smaller, the trader must sell the nearer and buy the distant contract. In order to profit when the discounts on the far months are expected to increase, one must buy the front and sell the back.

Calculating SPAN requirements—i.e., the risk performance bond (margin) requirements obtained using the Standard Portfolio Analysis of Risk system or the SPAN calculation algorithm, utilizing the disclosed embodiments, is described below in detail.

The SPAN algorithm has always been viewed as being applicable to an unlimited range of product types, but the original focus in its implementation has been on standardized futures, options on futures and options on physicals. Portfolios today, however, can contain the widest range of derivative and non-derivative instruments. SPAN 4 supports the ultimate in product flexibility using an advanced, object-oriented model. In particular, SPAN 4 adds support for equity securities and debt securities (stocks, bonds, etc.), and options thereon.

Despite these enhancements, the fundamentals of the SPAN calculation, and the principles behind them, have not changed. The underlying simplicity of SPAN has been preserved. The many new capabilities introduced with SPAN 4 should be thought of not as changes to the underlying methodology, but as providing a vastly greater degree of flexibility and control in the usage of SPAN.

Account types: Portfolios of positions to be margined using SPAN are held in performance bond accounts, or margin accounts. The positions in an account constitute a single portfolio.

If this is a particular performance bond account of a clearing member firm at a clearing organization, we say that the SPAN calculation done by that clearing organization for that account is a clearing-level calculation.

On the other hand, SPAN calculations may be done for particular customer or other accounts of firms which are clearing members, directly or indirectly, of one or more clearing organizations. These are firm-level, also called customer-level, calculations.

For any performance bond account, the account type is defined by:
   whether this is a clearing-level account or a firm-level account, and
   the specific account type code—for example, member, hedger, or speculator.

Business Functions and Exchange Complexes

A business function represents a particular purpose for which an exchange or clearing organization using SPAN wishes to perform the SPAN calculation or have it performed, at either the clearing-level or the customer-level. For example:
   Normal clearing-level calculation for a particular clearing organization, applicable to normal clearing-level account types
   Special member-clearing calculation for member clearing account types
   Normal customer-level calculation for the part of a portfolio traded on, or cleared by, a particular exchange or clearing organization
   Clearing-level calculation for a particular cross-margin agreement between clearing organizations
   Customer-level calculation for a customer portfolio for a particular cross-margin agreement By definition, a clearing-level SPAN calculation for a portfolio is always for a specific business function. In other words, the portfolio is identified with a specific business function, and may contain only products eligible for that business function.

By contrast, a customer-level portfolio may have any number of business functions represented within the portfolio.

Business functions are also referred to in SPAN as exchange complexes, and the identifier for a business function as the exchange complex acronym. For example, CME represents the exchange complex acronym for normal processing for the CME clearing organization Requirement levels: For any particular business function represented within a portfolio, the exchange or clearing organization using SPAN may mandate the calculation of more than one SPAN requirement number. Each such number is called a requirement level, and is specific to:
   the performance bond class of the requirement level, and
   the initial or maintenance designation of the requirement level.

Performance bond classes are used generically to designate different levels of SPAN requirements. The first class (the one with the lowest requirement level) is specially designated as the core class and the second class (the one with the next-highest requirement level) as the reserve class.

Any number of performance bond classes can be defined, and for any purpose. The most common purpose is to recognize different requirement levels that may be met by different classes of collateral assets. Typically the core requirement must be met by the highest-quality assets. The difference between the core requirement and the higher reserve requirement—the so-called reserve additional requirement—may be met by certain lesser-quality assets.

Within the specific performance bond class, the exchange or clearing organization using SPAN may mandate the distinction between the initial requirement level and the maintenance requirement level. The initial requirement is typically higher and applies to newly created portfolios. The lower maintenance requirement applies to previously existing portfolios. Typically this distinction is only made at the customer-level, and only for speculative customer portfolios.

Combined commodities: For each business function for which an exchange or clearing organization is using SPAN, the set of products eligible for that business function are grouped into combined commodities.

For each business function within a portfolio for which the SPAN calculation is being done, for each combined commodity represented within that business function, SPAN yields one or more SPAN risk requirements. Each such requirement corresponds to a specific SPAN requirement level—a specific performance bond class and an initial or maintenance designation.

SPAN requirements calculated for individual combined commodities represented in the portfolio are then aggregated to yield SPAN requirements for the different business functions represented within the portfolio, and for the entire portfolio.

The combined commodity may be thought of as the atomic-level of the SPAN calculation. It is the lowest breakdown of the products within a portfolio at which a performance bond requirement is obtained.

Typically, all products on the same ultimate underlying physical are grouped together into a combined commodity—for example, at the CME, all products related to the S&P 500 stock index.

Performance bond currencies: For each combined commodity, a single currency is specified as the performance bond currency for that combined commodity.

This is the currency in which the performance bond requirement for a combined commodity represented within a portfolio, will be denominated in.

Any number of performance bond currencies may be represented within the portfolio. Therefore, when aggregating SPAN requirements for the different combined commodities represented within the portfolio, these are typically first aggregated by performance bond currency.

These currency-level requirements may then be converted to a common currency for further aggregation. This common currency is typically called the native currency for the portfolio.

(The term "native currency" is used to reflect the fact that the desired common currency may be different for different portfolios, typically depending on the national origin of the portfolio owner.)

SPAN risk parameter files: Clearing organizations and/or exchanges using SPAN publish, at least once daily, one or more SPAN risk parameter files. For simplicity, these are typically referred to as SPAN files.

SPAN risk parameters may be generically defined as the set of data needed to calculate SPAN requirements, other than the actual portfolios for which the requirements are to be calculated. SPAN risk parameters consist of (a) product data and (b) performance bond rate data. In effect, a SPAN risk parameter file contains SPAN risk parameter data in machine-readable form.

Typically, SPAN risk parameter files contain data for exactly one point in time. In effect, they contain data to be used for performance bond calculations for portfolios existing at that point in time.

Within each point in time, the SPAN file contains data for one or more business functions of the exchange or clearing organization publishing the file. Within each business function, the file will contain data for each combined commodity defined for the business function.

Ultimately, the file will contain many different SPAN rates—for example, risk arrays, intracommodity spread charge rates, intercommodity spread credit rates, etc. Each such rate is qualified by the account type and requirement level to which it pertains.

For example, a risk array for a particular contract contained with a typical customer-level SPAN file may be designated as being for a hedge customer account, for the core performance bond class, and the maintenance requirement.

SPAN file formats previously in use only supported the inclusion of data for exactly one point in time, business function, and rate—i.e., account type, performance bond class, and initial or maintenance designation.

The new XML-based SPAN file format does not have this limitation.

Point in time: Risk parameters and portfolios are defined at particular points in time.

Points in time are categorized as to whether they are for:
the end of day settlement, or
an intraday point in time.

Some clearing organizations, for some business functions, may publish more than one SPAN file for the end-of-day settlement. These are typically distinguished as being for:
the final settlement, or
an early (or preliminary) settlement, or
the complete settlement.

In the early settlement SPAN file, typically final end-of-day settlement prices are available only for some of the products, while other products have intraday prices provided. The final settlement file typically contains final settlement prices for the day for all actively trading contracts. The complete file will contain final settlement prices for all contracts, actively trading or inactive.

An intraday point in time is further characterized by its business time—indicating the actual time to which prices and risk arrays pertain. A point in time, whether intraday or end of day, may also be characterized by its run number—for example, the first intraday run, the second intraday run, etc.

Risk arrays, risk scenarios, composite deltas, scan points and delta points

Risk arrays: A risk array is a set of numbers, defined:
for a particular contract
at a particular point in time
to be margined for a particular business function
for a particular account type, and
for a particular requirement level—performance bond class and initial or maintenance designation—for that account type.

Each risk array value specifies how a single long or short position will lose or gain value if the corresponding risk scenario occurs over the specified look-ahead time. By convention, losses for long positions are expressed as positive numbers, and gains as negative numbers.

The lookahead time: The lookahead time reflects the amount of time into the future from the current time, for which the SPAN requirement levels are intended to protect against declines in portfolio value. Lookahead time is a parameter of SPAN and may be set to any desired value. There are two methods, however, which are typically in use for its specification:
Actual time to the next business day: in this method, the number of calendar days from the current business day to the next business day is determined, and then divided by 365 days per year, to obtain the lookahead time in years.
Average time per business day: in this method, the lookahead time is typically set to one business day in a business year assumed to have 250 business days per year, or 0.004 years.

Use of actual time to the next business day more closely protects against the risk of larger changes in portfolio value over weekends and holidays, and may result in increased portfolio performance bond requirements on the business day prior to a weekend, especially a holiday weekend. If, however, it is desired to avoid having the performance bond requirement fluctuate merely because of weekends and holidays, use of average time per business day is more appropriate.

Risk Scenarios: Each risk scenario is defined in the following terms:
the (underlying) price movement
the (underlying) volatility movement, and
the weight, also called the covered fraction.

For futures, physicals and other non-option product types, these are the price movement and volatility movement for the instrument itself. For options, these are the price and volatility movements for the underlying instrument.

The values of the price movement, the volatility movement, and the covered fraction are determined by the scan point definitions and the two scan ranges—the price scan range and the volatility scan range. These values are the key inputs to SPAN.

Scan point definitions: Each scan point definition consists of:
the price scan magnitude, as the number of price scan ranges up or down—for example, 0.3333 or −2.000, meaning one third of the price scan range up, or twice the price scan range down
the volatility scan magnitude, as the number of volatility scan ranges up or down—for example, 1.0000 or −1.000, meaning the full volatility scan range up or down
the weight.

The price scan magnitude may itself be expressed in terms of a price scan numerator, a price scan denominator, and a price scan direction. For example, a price scan magnitude of −0.3333 may be expressed as a numerator of one, a denominator of three, and a direction of down. Similarly, the volatility scan magnitude may be expressed in terms of a volatility scan numerator, a volatility scan denominator, and a volatility scan direction.

SPAN 4 allows the definition, for each combined commodity of as many sets of scan points as may be desired, each for a different account type and requirement level. The definitions must be identical, however, for sets of combined commodities which have intercommodity spreads defined among them.

Calculation of risk array values: Generically, each risk array value is calculated as:
the current value of the contract
less the hypothetical future value of the contract, after the look-ahead time has passed, and (underlying) price and volatility movements associated with the risk scenario have occurred
multiplied by the weight.

For futures, physicals and certain types of combinations, this change in value is determined by the price change alone.

To determine the hypothetical future value for options, the underlying price change, underlying volatility change, decrease in time to expiration, and the associated interest rates must also be taken into account, and a theoretical price calculated using an option pricing model.

In order to ensure that biases in the option pricing model do not affect the result, the current value may also be calculated using the same option pricing model, assuming the current time to expiration, current underlying price, and current underlying volatility. In other words, the risk array value for an option is determined by subtracting the hypothetical future theoretical value of the option, from the current theoretical value of the option.

The actual model selected, the parameters of the model, the interest rates, and the look-ahead time are all parameters of SPAN.

The composite delta, and delta point definitions: The composite delta value is associated with each risk array defined for a contract. The composite delta is a probability-weighted average of a set of deltas calculated for the contract (a) after the look-ahead time has passed and (b) according to the scenarios defined by the definition of the delta points.

Delta points are defined exactly analogously to scan points, with a price scan magnitude, a volatility scan magnitude, and a weight. Suppose, for example, that there are seven delta points defined. Seven delta values are calculated for the contract, using the price scan magnitude and the volatility scan magnitude associated with each delta point, and assuming that the look-ahead time has passed. A weighted average of these deltas is then taken; using the weights specified in the delta point definitions.

In effect, a composite delta value represents an estimate of what the contract's delta will be after the look-ahead time has passed.

Overall SPAN process: To calculate SPAN requirements for a particular portfolio defined at a particular point in time, in which particular business functions for particular exchanges or clearing organizations are represented:
Obtain the applicable SPAN risk parameter file(s).
Using the positions in the portfolio, and the data contained in the SPAN files, apply the SPAN algorithm.
This yields the SPAN requirement:
for the specific account type
for each combined commodity of each business function represented in the portfolio
and for each combined commodity, for each applicable requirement level (performance bond class, initial or maintenance designation).

Determining the set of requirement levels to be calculated for a portfolio; direct and indirect calculation: For a combined commodity in a portfolio of a particular account type, it is necessary to select the set of performance bond requirement levels—i.e., unique combinations of performance bond class and initial or maintenance designation—for which SPAN requirements should be calculated, directly or indirectly.

A directly calculated SPAN requirement is a requirement, at a particular performance bond requirement level, for which the full SPAN calculation is done—i.e., scanning, spreading, etc.

An indirectly calculated requirement is one that is derived from another requirement, at a different requirement level, by the application of a simple multiplicative scaling factor. Indirectly calculated requirements are also known as derived requirements.

The selection of the set of requirement levels to be directly calculated, for a particular combined commodity in a portfolio, is driven by the set of requirement levels represented in the risk arrays for the products in that combined commodity. In particular, this is driven by which set of requirement levels are present for which account types.

If there are risk arrays for this combined commodity for the particular account type of the portfolio, then these are the ones that determine the requirement levels to be directly calculated.

For example, suppose the portfolio is for a hedge customer, and in the SPAN file for a particular combined commodity in the portfolio, one set of risk arrays is provided for hedge customers—specifically, for the core maintenance requirement level. In this case one SPAN requirement level should be directly calculated—the hedge customer core maintenance level.

On the other hand, suppose there were risk arrays for two requirement levels for this account type—for core maintenance and for core initial. In that case we would directly calculate separate SPAN requirements for these two levels.

On the other hand, if there are no risk arrays for this portfolio's account type, then one of the other account types for which risk arrays are present is selected, and SPAN requirements are calculated for the levels defined for this selected account type.

Risk adjustment factors and derived requirements: For each combined commodity, any number of risk adjustment factors may be provided in the SPAN risk parameter file.

Risk adjustment factors may be used either to adjust requirements at directly calculated risk levels, or to derive requirements at other risk levels (indirect calculation.)

Each risk adjustment factor has the following defined for it:
the account type to which it pertains
the base requirement level, i.e., the requirement level—performance bond class and initial or maintenance designation—which will be used to derive another one
the target requirement level—the requirement level being adjusted or derived
the value of the factor To apply a risk adjustment factor, simply multiply the requirement at the base level by the value of the factor.

Adjustment factors used to derive an initial requirement for a particular performance bond class from a maintenance requirement for that class are also known as initial to maintenance ratios.

The SPAN calculation, summarized:
A directly-calculated SPAN requirement at a particular requirement level for a combined commodity in a portfolio is calculated as:
Sum the scan risk, the intracommodity spread risk, and the delivery (spot) risk.
Subtract the intercommodity spread credit.
Take the larger of this result, and the short option minimum.

The scan risk is the risk for a combined commodity in a portfolio assuming perfect correlations in price and volatility movements of the underlying instruments over time.

The intracommodity spread risk allows the recognition of risk associated with spreading within the combined commodity—so-called calendar spreads—for combined commodities where there is imperfect correlation of price and volatility movements over time, and allows precise targeting of these requirements to particular intracommodity strategies.

The delivery, or spot risk, recognizes the unique risk characteristics of physically deliverable products, and of derivatives based on such physically deliverable products, as they approach the delivery period or go through the delivery process.

The intercommodity spread credit provides appropriate credits recognizing risk offsets between positions in the different combined commodities represented in the portfolio.

The short option minimum recognizes the unique characteristics of short option positions, and allows the recognition of a minimum risk value for deep out-of-the-money short options.

The sum of the scan risk, intracommodity spread risk, and the delivery risk is often referred to as the commodity risk, i.e., it is the risk for the combined commodity in the absence of any credits for intercommodity spreading.

The result obtained by subtracting the intercommodity spread credit from the commodity risk is often referred to as the pre-SPAN risk. This value is the directly calculated SPAN requirement, assuming that the short option minimum requirement is less.

Products supported in SPAN: SPAN supports the widest possible range of derivative and non-derivative product types. There is no product type that cannot be margined using SPAN.

Product terminology: The terms contract and product are used herein interchangeably to refer to a specific tradable instrument—physical or not, derivative or not—in which positions to be margined may be held.

Clearing organizations, exchange groupings, and product families

At the highest level, products are cleared by clearing organizations.

Each clearing organization may have one or more exchange groupings defined for it.

Within each exchange grouping, products are grouped into product families.

Generally, a product family is identified within an exchange grouping by a product code—an alphanumeric value, for example, SP at the CME for products related to the S&P 500 stock index—and a product type—for example, futures, options on futures, etc.

Each product family is also assigned a product family ID number that is unique within the clearing organization and may be unique within the exchange grouping.

Product families may be defined in as specific a manner as desired. For example, at the CME, other parameters used to make product families unique include the settlement method (cash-settled or physically deliverable), the valuation method (futures-style or equity-style), the settlement currency, and, for options, the exercise style (American or European). Contract size may also be used to as a factor, which defines separate product families, although SPAN also supports the inclusion of contracts of different sizes in the same product family.

Contracts: In SPAN, tradable instruments, whether derivative or non-derivative, are generically referred to as contracts or as products. As described above, contracts are grouped together in product families, and product type is always one of the things that makes a product family unique.

Product types and underlying product types: SPAN 4 allows the creation of any number of product types. Product types may be for physicals or derivatives and, if the latter, for combination or non-combination products.

Each contract (product) which is not a physical of one or another type is classified as a derivative, and has one or more underlying contracts.

Derivative products that have exactly one underlying contract are known as non-combination derivatives.

For example, a futures contract has a single underlying contract, called the underlying physical. An option on a future has a single underlying contract, the underlying future. An option on a physical has a single underlying contract, the underlying physical.

Derivative contracts that have two or more underlying contracts are generically known as combinations. Each such underlying is referred to as a leg of the combination.

For example, a combination, which is a futures calendar spread, would have two underlying contracts—the futures contract which is the front contract of the spread, and the futures contract which is the back contract of the spread.

At this time, SPAN recognizes three subtypes of the generic physical type: equity securities, debt securities, and debt securities margined on an equivalent basis.

Swaps, repos and reverse repos are recognized as subtypes of the combination type.

Contract structure and contract underlying ratios: The set of underlying contracts for a derivative product is known as its contract structure. Each element in the set specifies:
the specific underlying contract
the underlying ratio for this specific underlying contract.
Underlying ratio may be defined as follows:
For any contract X which is not a physical:
For each of its underlying contracts $Y_i$:
The underlying ratio is the number of units of that underlying $Y_i$ which are bought (or sold) per one long position of the contract X, expressed as a positive number if buying, or a negative number if selling.
In other words, the underlying ratio tells you:
whether buying the derivative means buying or selling this specific underlying contract, and
how many of this specific underlying are bought or sold per purchase of one derivative contract.

For example, the contract structure for a futures butterfly spread would specify that buying one spread means buying one of the first future, selling two of the second future, and buying one of the third future.

For example, a call option on 100 shares of stock. If you hold one long position in this call, and you exercise it, you receive (purchase) 100 shares of stock. Hence the underlying ratio is +100. On the other hand, if you own a put option on 100 shares of stock, and you exercise it, you deliver (sell) 100 shares of stock. Hence the underlying ratio for this put option is −100.

Contract Price and Contract Value Calculations: Every contract, at every point in time, has a contract price associated with it.

For exchange-traded instruments, for SPAN being used as an end-of-day tool for calculating performance bond (margin) requirements, this will be the end-of-day settlement price.

At other points in time—for example, during the trading day—this may be an intraday theoretical price.

SPAN uses the price of a contract to determine the monetary value of a single position in that contract—the contract value. This monetary value is expressed in the settlement currency for the contract, also called the price quotation currency.

To calculate contract value multiply the contract price by the contract value factor for the contract. The contract value factor is the multiplier, which converts a quoted price for the contract into its monetary value in the contract's settlement currency.

(The contract value factor can in turn be derived from the specification of the contract size and the convention used for quoting prices. For example, for the CME's live cattle futures contract, the contract size is 40,000 pounds and the price is quoted in dollars per 100 pounds. Hence the contract value factor is 40,000/100=400.)

Contract periods: The concept of contract period is used in SPAN to denote products with different maturities or expirations. Contract period can be thought of as a generalization of the contract month concept.

All contracts (except those that are margined on an equivalent basis) have a contract period code defined. Contract period codes may be six, seven, or eight bytes in length. The first six bytes consist of numeric digits. The seventh and eighth bytes, if defined, may consist of any alphanumeric character. A contract period code has the following structure:
the four-digit year number—for example, 1999
the two-digit month number—for example, 05 for May
if needed, a two-byte string which may be used to further qualify the contract period.

Option Series: An option series in SPAN 4 consists of all options with the same expiration and the same underlying.

Standard options within a series, then, differ from each other only in their strike price and their option right—i.e., whether they are puts or calls.

For more exotic options, such as barrier options, they may also be distinguished by one or more barrier prices.

Participation of product families in business functions: A product family is said to participate in a particular business function, if it has been assigned to one of the combined commodities defined for that business function.

Every product family always participates in the normal clearing business function for its clearing organization. It may, but is not required to, participate in additional business functions.

Combined commodities and delta periods: The products assigned to a combined commodity determine an array of delta periods defined for that combined commodity. Each contract is mapped into a specific delta period, and delta periods in turn are mapped into tiers.

Tiers and Tiered Processing: A tier in SPAN is a contiguous range of delta periods within a combined commodity.

To provide the utmost flexibility, tiered processing is supported in SPAN 4 for:
scan rate tiers—the specification of tiers for defining price scan ranges and volatility scan ranges
scanning tiers
intracommodity spread tiers
intercommodity spread tiers
short option minimum rate tiers Specific tiers of a particular type for a combined commodity are always identified by a tier number beginning with one, and are further qualified by a beginning period code and an ending period code. The ending period code must be greater than or equal to the beginning period code, and the delta periods for the different tiers never overlap.

For intra- and inter-commodity spreading, sometimes there are cases where more than one tier is defined, but it is desired in a particular leg of a spread to reference the entire combined commodity, across all tiers. To support this, SPAN recognizes for each combined commodity an intracommodity spread tier zero and an intercommodity spread tier zero, which are defined as the range of period codes for the entire combined commodity, crossing individual tiers. This may also be referred to as the overall tier.

One important aspect of SPAN 4's flexibility is the ability for scanning tiers and intercommodity spreading tiers to be defined independently. Previously there were limitations on this ability.

Mapping Each Delta Period into its Tier

For a given tier type for a combined commodity, to determine the tier into which a delta period maps:
Compare the delta period code with the beginning period and the ending period.
If the delta period code is greater than or equal to the beginning period, and less than or equal to the ending period, then it maps into that tier.

Portfolios to be margined: As described above, a portfolio of positions to be margined using SPAN is held in an account. Each such account has a specific account type.

Portfolios may be defined at either the clearing-level or the customer-level. In other words, they are either for a specific performance bond account of a clearing member firm of a clearing organization, where the margin calculation is being done by that clearing organization, or they are for a specific customer-level account of a member firm or other trading firm, where the margin calculation is being done by that firm.

A clearing-level portfolio always holds positions for a single business function of that clearing organization, while any number of business functions and clearing organizations may be represented in the positions for a customer-level portfolio.

Position definition: A position within a portfolio to be margined at a particular point in time, is defined by:
  the point in time at which the portfolio exists
  the portfolio in which the position is contained, specified as the firm identifier, the account identifier, the account type (including whether this is a clearing-level or firm-level account), and the segregation type
  the contract in which the position is held, and the business function for which the contract is to be margined, and
  the position quantity number(s).

For example, a particular position might be defined as:
  the end-of-day settlement for Dec. 1, 1999
  firm 322, account XYZ, account type hedge customer, and segregation type CUST (for Customer)
  the CME's December 1999 S&P futures contract, to be margined for the normal business function, and
  a net position of +17.

Gross and net position keeping: A gross position is one that may be simultaneously long and short. A net position is one that is never simultaneously long and short.

In other words, a net position is one that is determined by netting together the beginning position for the day with all buys and sells for that day. For net positions, all trades are liquidating to the extent possible.

A gross position is determined by the beginning of day position and, for each trade done for that day, whether it was an opening (new) or closing (liquidating) transaction.

At the firm-level, accounts are commonly kept net, with two typical exceptions: (1) omnibus accounts, discussed below, and (2) certain types of hedger accounts.

At the clearing level, positions are typically kept gross for accounts which themselves are aggregates of more than one account at the firm level, in order to reflect true open interest.

Net margining: At the firm-level and often at the clearing-level, portfolios are typically "net margined." This is also typically called "calculating a net requirement." This means two things:
  If the position is kept gross—i.e., if the position may be simultaneously long and short—then it is first netted before being processed in SPAN. Only the portfolio of net positions is margined.
  No restrictions are placed on the recognition of risk offsets between different parts of the portfolio.

Since SPAN does recognize all allowable risk offsets, as they are defined in the SPAN risk parameter file and as they are present in the portfolio, "net margining" translates into, process a portfolio of net positions via SPAN.

Note that there is a distinction between gross and net position keeping, and gross and net margining: A position may be simultaneously kept gross, while being margined net. This is sometimes the case for certain types of hedge customer accounts.

Omnibus accounts and levels of disclosure; gross margining at the firm level: An omnibus account is an account of one firm on another firm's books, which account is itself comprised of a number of individual accounts on the first firm's books. The firm with the omnibus account is said to carry the omnibus account on its books, and is often called the "carrying firm." The individual accounts on the first firm's books are said to be "subaccounts" of the omnibus account.

Because an omnibus account is comprised of any number of subaccounts, omnibus account positions must be kept gross. Any given position in any omnibus account may itself be the sum of a number of subaccount positions, some of which may be long and some of which may be short.

If the omnibus account is "fully disclosed" to the carrying firm which must calculate a margin requirement for it, this means that it has informed the carrying firm of each individual subaccount and what its positions are. Depending on business practices, this may not mean that it has identified the owner of each subaccount, but rather simply that it is has specified which sets of positions belong to single owners.

In this case, the carrying firm typically calculates a net requirement for each subaccount, and the total omnibus account requirement is simply the sum of the subaccount requirements.

On the other hand, an omnibus account portfolio may be only "partially disclosed", or "non-disclosed."

If partially disclosed, the omnibus account has provided information to the carrying firm about some sets of subaccounts, but not of all. If non-disclosed, no information is provided about the subaccounts and which positions they hold.

The portion of each gross omnibus account position which is not held in disclosed subaccounts, is typically said to be "naked". In other words, for each position—total long and total short—there is a naked portion—the naked long and naked short.

These naked positions are typically "gross margined." This means that:
  A separate SPAN requirement is calculated for each naked long position quantity, and for each naked short position quantity. Because each such position quantity is in a single contract, and is only on one side of the market, there are no risk offsets recognized in such requirements.
  The total requirement for the naked portion of the account portfolio is the sum of all of these individual naked long and naked short requirements.

If the omnibus account is partially disclosed, its total requirement is the sum of all of the net requirements for the subaccounts, plus the sum of all of the individual naked long and naked short requirements for the naked positions.

Gross-margining at the clearing level: At the clearing-level, the overall term "gross margining" is used to refer to a business practice where:
  Positions are kept gross—i.e. may be simultaneously long and short.
  Some portion of the total long and total short for each position is broken out, and margined net. This portion is termed the fully inter-commodity spreadable long and short, and is often referred to as the "intercommodity spreadable" or the "inter-spreadable" long and short, or as just the "inter positions."
  Another portion of each total position is broken out, and margined net, except that no risk offsets are recognized among the different combined commodities in the portfolio—i.e., no intercommodity spreading is done. This portion is termed the "intracommodity spreadable", the "intra-spreadable" or as just the "intra positions."
  The remaining portion of each total position is considered naked, and margined gross.

We say that some portion of the total positions has been deemed to be spreadable both within commodities and between commodities, another portion to be spreadable only within commodities but not between commodities, and that a final portion to be spreadable not at all. The total SPAN requirement for each combined commodity in the clearing-level portfolio is then determined from the various components of the SPAN requirements calculated for these different position types.

So at the clearing-level, "gross margining" doesn't mean that positions are fully gross margined, but rather that some portion of the overall positions may be.

Clearing-level gross margining is typically used for customer-origin performance bond accounts where the clearing-level positions are determined by aggregating positions across many individual customer accounts. Typically, the positions within each customer account are inspected to determine whether risk offsets exist both within and between commodities, or only within commodities, or not at all. Based on this inspection, the customer's positions are classed as inter-spreadable, inter-spreadable, or naked. The total clearing-level inter-spreadable long and short positions, then, are calculated as the sum of the customer positions that were classed as inter-spreadable, and analogously for the intra-spreadable positions.

Position accounts, performance bond accounts, margin dispositions, and positions to be margined At the clearing-level, it is possible for a distinction to be drawn between the position accounts in which positions are kept, and the performance bond accounts in which they are margined.

In this case, there may be a great deal of flexibility in how positions roll up from position accounts to performance bond accounts.

For example, positions in products eligible for participation in a particular cross-margin agreement may be routed to a performance bond account specifically for that cross-margin business function, whereas positions in other products, not eligible for this cross-margin agreement, are routed to a performance bond account specified as being for the normal business function.

Even within a particular position, if that position is eligible for more than one business function, the position itself may be broken down into any number of "positions to be margined", or "dispositions", each of which is designated for a particular performance bond account and hence to be margined via the SPAN parameters for a specific business function.

For example, a total gross position of 100 long and 200 short in a product eligible for a particular cross-margin agreement, might have dispositions for it of 50 long and 75 short for the cross-margin business function, and 50 long and 125 short for the normal business function.

Within each disposition, the position-to-be-margined may be margined either "gross" or net. If "gross", each total position-to-be-margined is further broken down into an inter-spreadable long and short, an intra-spreadable long and short, and a naked long and short. If "gross", as described above, the inter-spreadable positions are margined net, the intra-spreadable positions are margined net but without allowing inter-commodity spreading, and the naked positions are truly margined gross.

The SPAN calculation for net portfolios: This section contains the description of the detailed algorithm for calculation of a SPAN risk requirement for each combined commodity represented in a portfolio to be margined on a net basis—a so-called "net portfolio." This may be either a customer-level portfolio or a clearing-level portfolio.

Position processing: Position processing in SPAN consists of processing each position within each combined commodity represented in the portfolio, for the purposes of:

Scanning: scaling up the risk array(s) for the contract by the position quantity, and incrementing the overall risk array(s) by these scaled-up risk array(s)

Delta calculation: scaling up the SPAN composite delta(s) for the contract by the position quantity, and incrementing the overall position delta(s) for the associated delta period by these scaled-up composite delta(s)

Short option minimum calculation: determining the effect of the position on the quantity for determination of the short option minimum charge (also called the minimum commodity charge).

Position value calculation: evaluating the current monetary value of each position, and incrementing the overall current monetary values for the combined commodity, broken out by whether the position is long or short and by whether the contract is valued futures-style or premium-style.

Position types for the position value calculations: Products can be categorized by whether their valuation method is futures-style or premium-style:

For futures-style products, there is a daily mark-to-market for open positions, and the resulting settlement variation amounts are paid or collected daily.

For premium-style products, the full trade price (premium) is paid or collected when the position is opened.

Futures contracts, of course, are valued futures-style; the daily mark to market and the daily payment or collection for settlement variation (sometimes called "variation margin") is what distinguishes them from a forward contract.

Option positions are typically valued premium-style, but some exchange-traded options are valued futures-style.

The significance of whether a position is valued premium-style is as follows: If a position is valued premium style, and if the full value of the premium is considered to have been paid (or collected), then the current value of the position is counted as a collateral asset (if long) or a liability (if short).

For the positions in each combined commodity represented in the portfolio, then, it is necessary to determine the value of those positions broken out the following ways:

by whether the positions are valued futures-style or premium-style by whether the position quantities are long or short by whether the positions are in options or are not in options.

In other words, for each combined commodity in the portfolio, we will have determined:

value of long non-option positions in products valued futures-style value of short non-option positions in products valued futures-style value of long option positions in products valued futures-style value of short option positions in products valued futures-style value of long non-option positions in products valued premium-style value of short non-option positions in products valued premium-style value of long option positions in products valued premium-style value of short option positions in products valued premium-style Note that in some cases, the exchange or clearing organization using SPAN may establish a business rule regarding the timing of the recognition of value for premium-style products. For example, suppose an unsettled trade for a stock done for the current business day is included in the portfolio of positions to be margined, and that this trade will settle three days subsequently. In this case, the clearing organization might decide not to give full or even partial credit for the premium value of this trade until it has settled and the full premium has been paid or collected. If so, the total premium value used for the purpose of determining whether a margin excess or deficit exists, should be adjusted by the amount of this premium value for which credit is not being given.

Special position-processing features: In addition to regular position processing, SPAN supports several special position-processing features which provide additional power and flexibility:

Split Allocation is typically used for positions in combinations and/or options on combinations where the underlying instruments of the combination are in different physical commodities.

With this feature, the position in the combination or the option on the combination, is split out (allocated) into positions on the underlying instruments of the combination.

Delta-Split Allocation is typically used for positions in combinations and/or options on combinations where the underlying instruments of the combinations are at different expirations within the same physical commodity. This is similar to regular split allocation, but differs in that only the delta from the position in the combination or the option on the combination, is split out to the delta periods of the underlying legs.

Equivalent Positions is used when it is desired to margin a position in one instrument, as one or more equivalent positions in other instruments.

Expression of Net Position Numbers: For positions in a net portfolio, position quantities are expressed as signed numbers, positive for a net long position, and negative for a net short position.

Depending on the types of instruments in the portfolio and the conventions used for expressing their positions, it is possible for position quantities to be fractional—i.e., not whole numbers.

Pre-Processing for Margining Debt Securities on an Equivalent Basis: For positions in physical debt securities, which are being margined on an equivalent basis, it may be necessary to perform special pre-processing to express the position quantities properly, even before the transformation of the debt securities position into its equivalents. This section describes that pre-processing.

For government debt securities to be margined on an equivalent basis, positions should be expressed in units of thousands of par value currency units in the currency of denomination. For example, a position in a U.S. Treasury Bond with a face value of $1,000,000 should be expressed as 1,000.

Positions to be margined in such physical debt securities are those resulting from not-yet-settled trades. The actual position in such securities can sometimes be broken out as the sum of:

the net position from open outright trades, and the net position from open repos (or reverse repos) in which the on-leg has settled but the off-leg has not yet settled, with a net repo position expressed as a positive number and a net reverse repo position expressed as a negative number. Such repos are referred to as same-day repos when they are entered into (and margined), since on the day they are entered into, the on-leg settles, leaving only the unsettled off leg to be margined.

Repo and reverse repo positions where neither leg has settled are typically considered to be next-day repos. In other words, the repo is entered into today, with the on-leg beginning tomorrow. Since the on-leg and the off-leg are both not-yet-settled, these obligations cancel each other out. So these next-day repo or reverse repo positions are not included in the margin calculation.

Processing Split-Allocation Positions: After transforming any positions to be processed on an equivalent basis into their equivalents, the next step in position processing is to deal with any positions that are to be handled using the split allocation method.

As described above, split allocation is typically used for positions in options on futures intercommodity spreads. The method is generically applicable, however, to any combination product or option on combination product.

The specification of whether split allocation is to be performed is done for a product family linked into a combined commodity. Not all product families linked into a combined commodity need be processed using split allocation. In general, however, for the algorithm to yield the desired results, split allocation should be specified for both the options on the combination, and the combination itself. Typically both of these product families will be placed into the same combined commodity.

Determining position quantities for further processing: With positions to be processed on an equivalent basis transformed into their equivalents, and positions to be processed via split allocation, allocated out to their underlyings, we're now ready to determine the position quantities to be carried forward in SPAN.

The following applies to all position types except positions processed on an equivalent basis. (As explained above, such positions play no additional role in the calculations once they have been transformed into their equivalents.)

The algorithm will evaluate five different values for each position:
  the total position
  the marginable position
  the position for valuation
  the position for scanning
  the positions for the short option minimum calculation—
    the number of short calls and the number of short puts
For each position in the portfolio:
  The total position is equal to the sum of the position in the contract itself, the equivalent position, and the position resulting from split allocation.
  The marginable position is equal to the total position times the contract-scaling factor.
  The position for valuation is the sum of the position in the contract itself and the rounded position resulting from equivalents.
  The position for scanning is determined as follows:
    If the product family for this position is processed either normally or via delta-split-allocation, take the marginable position.
    If the product family for this position is processed via split allocation, take zero.
  The positions for the minimum commodity charge are determined as follows:
    If this position is not for an option, then the number of short calls and the number of short puts are both zero.
    But if this position is for an option:
      If the marginable position is zero or positive, then the number of short calls and the number of short puts are both zero.

But if the marginable position is negative:
  If the option is a call, the number of short calls is equal to the absolute value of the product of the marginable position and the delta-scaling factor. The number of short puts is zero.
  If the option is a put, the number of short puts is equal to the absolute value of the product of the marginable position and the delta-scaling factor. The number of short calls is zero.

Determining the Position Value: For each combined commodity in the portfolio:
  For each position in the portfolio:
    Take the position for valuation as determined above.
    Multiply this result by the value of a single contract, yielding the value of the position in the settlement currency for the contract.
    If the performance bond currency for the combined commodity in which the product is contained is different from the settlement currency of the product, convert the value from the settlement currency to the performance bond currency, rounding as may be needed to the normal precision of the performance bond currency. This yields the value of the position in the performance bond currency for the combined commodity.

Determining the Liquidation Risk Position Value: The Liquidation Risk calculation is a method of determining the Scan Risk, which has been introduced in SPAN for the Paris Bourse (SBF.) This calculation requires the determination of a special position value called the Liquidation Risk Position Value. As can be seen, this differs from the regular position value in that (a) it includes any position quantity resulting from split allocation, and (b) for positions in debt securities, it is adjusted for the duration of the security.

For each combined commodity in the portfolio for which "liquidation risk" has been specified as the method for determining the scan risk:
  For each position for products linked into this combined commodity:
    Take the position for scanning, as determined above.
    If this position is in a debt security, multiply this value by the duration of that security, expressed in years.
    Multiply this result by the value of a single contract.
    If the performance bond currency for the combined commodity in which the product is contained is different from the settlement currency of the product, convert this value from the settlement currency to the performance bond currency.
    Round this result as specified. (The rounding convention used by SBF for liquidation risk position value is to round down—toward zero—to five decimal places.)
    The result is the liquidation risk position value.

Determining the Currency Conversion Rates for the Intercurrency Risk Scanning feature of the Scan Risk calculation: Intercurrency risk scanning is an optional feature of the scan risk calculation which may be applied in cases where there are products whose settlement currency is different from the performance bond currency of the combined commodity into which they are linked.

When a product family is linked into a combined commodity, it may be specified that intercurrency risk scanning is applicable.

If intercurrency risk scanning is specified, then the risk array values for that product family linked into that combined commodity are denominated in the settlement currency for that product family.

For each such settlement currency and performance bond currency pair, it is necessary to determine the exchange rate up and the exchange rate down:
  For a given settlement currency and performance bond currency pair, read the intercurrency scan rate up and the intercurrency scan rate down. (These are provided in the London format SPAN file on the currency conversion rate record for that currency pair.) Express these values as decimal fractions. If the settlement currency is equal to the performance bond currency, take zero for these values.
  Take the exchange rate multiplier, which converts a value in the settlement currency to one in the performance bond currency. If the settlement currency is equal to the performance bond currency, take one for this value.
  Multiply the exchange rate by the value of one plus the intercurrency scan rate up, yielding the exchange rate up.
  Multiply the exchange rate by the value of one minus the intercurrency scan rate down, yielding the exchange rate down.

Determining the Scaled-Up Risk Array(s) and Delta(s) for the Position: For each combined commodity in the portfolio for which scanning is being performed normally (not using the "liquidation risk" scanning method):
  For each product family in this combined commodity:
  For each position in this product family:
    Take the position for scanning as determined above.
    For each directly calculated requirement level for this portfolio type and combined commodity:
      Take the risk array for this product as linked into this combined commodity and for this requirement level.
      Multiply each element in the risk array by the position for scanning, yielding the scaled-up risk array for the position.
      If the intercurrency risk scanning feature is enabled for this product family:
        Multiply each element in the scaled-up risk array by the exchange rate up for this settlement currency/performance bond currency pair, yielding the scaled-up converted-up risk array.
        Multiply each element in the scaled-up risk array by the exchange rate down for this settlement currency/performance bond currency pair, yielding the scaled-up converted-down risk array.
      To determine the position delta:
        Take the composite delta for this product as linked into this combined commodity and for this requirement level.
        Multiply the position for scanning by the composite delta and then by the delta-scaling factor.

Aggregation of position values to the combined commodity: For each combined commodity in the portfolio:
  For each position in the combined commodity:
    Take the position value as calculated above.
    Using the position value, increment one of eight value buckets for the combined commodity determined according to whether:
      The position value is long (positive) or short (negative).
      The position is for an option or a non-option.
      The position is valued futures-style or premium-style.

Aggregation of short option positions: For each combined commodity in the portfolio:
  For each position in the combined commodity:
    For each short option minimum rate tier for the combined commodity:
      Increment the number of short calls for the overall tier by the number of short calls for the position as calculated above.
      Increment the number of short puts for the overall tier by the number of short puts for the position as calculated above.
Determining the Number of Short Option Positions for a Tier: If the short option minimum charge method for the combined commodity is gross:
  Take the sum of the number of short calls for the tier and the number of short puts for the tier.
If the short option minimum charge method for the combined commodity is maximum:
  Take the larger of the number of short calls for the tier and the number of short puts for the tier.
Determining the Short Option Minimum Charge: For each combined commodity in the portfolio:
  For each directly calculated requirement level:
    For each short option minimum rate tier
      Determine the number of short option positions for the tier.
      Multiply by the short option minimum charge rate to yield the charge for the tier.
      Take the sum of the charges for the specific tiers, yielding the overall charge for the combined commodity.
Aggregation of scaled-up risk array values to the scanning tier(s) and the intercommodity spread tier(s): For each combined commodity in the portfolio for which scanning is being performed normally (not using the "liquidation risk" scanning method):
  For each position in the combined commodity:
    For each directly calculated requirement level for the portfolio:
      If intercurrency risk scanning is not enabled for the product family for this position in this combined commodity:
        Increment each element in the overall scanning tier risk array, by the corresponding element in the scaled-up risk array for the position.
        If there are specific scanning tiers for the combined commodity, select the specific scanning tier in which this product is contained, and increment each element in the risk array for the specific tier, by the corresponding element in the scaled-up risk array for the position.
        Increment each element in the overall intercommodity spread tier risk array, by the corresponding element in the scaled-up risk array for the position.
        If there are specific intercommodity spread tiers for the combined commodity, select the specific intercommodity spread tier in which this product is contained, and increment each element in the risk array for the specific tier, by the corresponding element in the scaled-up risk array for the position.
      But if intercurrency risk scanning is enabled for the product family for this position in this combined commodity:
        Increment each element in the overall scanning tier exchange rate up risk array for this settlement currency/performance bond currency pair, by the corresponding element in the scaled-up exchange rate up risk array for the position.
        Increment each element in the overall scanning tier exchange rate down risk array for this settlement currency/performance bond currency pair, by the corresponding element in the scaled-up exchange rate down risk array for the position.
        If there are specific scanning tiers for the combined commodity, select the specific scanning tier in which this product is contained, and:
          Increment each element in the exchange rate up risk array for the specific tier for this settlement currency/performance bond currency pair, by the corresponding element in the scaled-up exchange rate up risk array for the position.
          Increment each element in the exchange rate down risk array for the specific tier for this settlement currency/performance bond currency pair, by the corresponding element in the scaled-up exchange rate down risk array for the position.
        Increment each element in the overall intercommodity spread tier exchange rate up risk array for this settlement currency/performance bond currency pair, by the corresponding element in the scaled-up exchange rate up risk array for the position.
        Increment each element in the overall intercommodity spread tier exchange rate down risk array for this settlement currency/performance bond currency pair, by the corresponding element in the scaled-up exchange rate down risk array for the position.
        If there are specific intercommodity spread tiers for the combined commodity, select the specific intercommodity spread tier in which this product is contained, and:
          Increment each element in the exchange rate up risk array for the specific tier for this settlement currency/performance bond currency pair, by the corresponding element in the scaled-up exchange rate up risk array for the position.
          Increment each element in the exchange rate down risk array for the specific tier for this settlement currency/performance bond currency pair, by the corresponding element in the scaled-up exchange rate down risk array for the position.
Aggregation of position delta to the delta periods: For each combined commodity in the portfolio for which scanning is being performed normally (not using the "liquidation risk" scanning method):
  For each position in the combined commodity:
  For each directly-calculated requirement level for the combined commodity:
    Take the position delta. (If the position is being processed via split allocation, the position delta will be zero and there is no need to continue.)
    If the product is processed normally, increment the period delta for this requirement level and for the delta period containing this contract, by this position delta.
  If the product is processed using delta-split-allocation, allocate the position deltas out to the underlying(s) Initialization of Tier Deltas
  For intracommodity spread tiers:
  For each combined commodity in the portfolio:
  For each directly calculated requirement level:
    For each intracommodity spread tier:
      Initialize the total long delta for the specific tier by taking the sum of all period deltas contained within the tier which are positive (i.e., net long.)

Initialize the total short delta for the specific tier by taking the sum of all period deltas contained within the tier which are negative (i.e., net short), and then by taking the absolute value of this result.

For the overall tier:
Initialize the total long delta for the overall tier by taking the sum of the total long deltas for the specific tiers.
Initialize the total short delta for the overall tier by taking the sum of the total short deltas for the specific tiers.

For intercommodity spread tiers:
For each combined commodity in the portfolio:
For each directly calculated requirement level:
For each intercommodity spread tier:
Initialize the total long delta for the specific tier by taking the sum of all period deltas contained within the tier which are positive (i.e., net long.)
Initialize the total short delta for the specific tier by taking the sum of all period deltas contained within the tier which are negative (i.e., net short), and then by taking the absolute value of this result.
Net these two results against each other: subtract the total short delta from the total long delta. If the result is positive, store it as the total long delta and set the total short delta to zero. If the result is negative, take its absolute value, store it as the total short delta, and set the total long delta to zero.

For the overall tier:
Initialize the total long delta for the overall tier by taking the sum of the total long deltas for the specific tiers.
Initialize the total short delta for the overall tier by taking the sum of the total short deltas for the specific tiers.
Net these two results against each other: subtract the total short delta from the total long delta. If the result is positive, store it as the total long delta and set the total short delta to zero. If the result is negative, take its absolute value, store it as the total short delta, and set the total long delta to zero.

Determining the Scan Risk and Related Values for Scanning and Intercommodity Spreading Tiers: For each combined commodity in the portfolio for which scanning is being performed normally (not using the "liquidation risk" scanning method):
For the overall scanning tier, for the overall intercommodity spreading tier, for each specific scanning tier if there are any, and for each specific intercommodity spreading tier if there are any:
For each directly calculated requirement level:
If intercurrency risk scanning was enabled for any product family in this combined commodity:
For each settlement currency/performance bond currency pair for this combined commodity represented among the set of product families for which intercurrency risk scanning was enabled:
Compare each element in the exchange rate up array with the corresponding element in the exchange rate down array. For each element, select the larger value (more positive or less negative), thereby yielding the overall risk array for this tier and currency pair.
Sum the overall risk arrays for the various currency pairs for the tier, together with the array for the tier for products for which intercurrency risk scanning was not enabled (if any), thereby yielding the overall risk array for the tier.
Select the largest (most positive) value in the risk array. This is the largest loss for the tier, and the corresponding risk scenario is called the active scenario. For scanning tiers only, this value is also called the scan risk for the tier.

For intercommodity spread tiers only:
Select the risk array value with the same definition for price movement as the active scenario, but the opposite definition of volatility movement. This is called the paired point.
Take the average of the risk array values for the active scenario and the paired point. Round this result as specified in the rounding convention for time and volatility risks for this exchange complex, yielding an estimate of the volatility risk for the tier.
Take the two risk array values with scenario definitions of (a) no price change and (b) opposite volatility changes. Take the average of these two values, yielding an estimate of the time risk for the tier.
Subtract the estimates of volatility risk and time risk from the scan risk, yielding an estimate of the price risk.
Calculate the weighted price risk for the tier via one of three weighted price risk calculation methods.

Determining the weighted price risk for an intercommodity spread tier: There are three methods for calculating the weighted price risk for an intercommodity spread tier: normal, normal with capping, and scanrange.
If the method is normal:
Subtract the value of the short delta for the tier from the value of the long delta for the tier, yielding the net delta for the tier.
Divide the price risk for the tier by the net delta.
Take the absolute value of this result.
If the method is scanrange:
Select the first non-option contract within the tier that has a non-zero value for its price scan range.
Take that price scan range.
Divide that value by the product of the contract's contract scaling factor and delta-scaling factor. (This takes relative contract size differences into account, converting the value into one applicable to a "standard" sized contract.)
If the method is normal with capping:
Calculate the weighted price risk first via the normal method, and again via the scanrange method.
Take the smaller of these two values. (In effect, it is calculated normally, but its value is capped at the scan range.)

Determining the Scan Risk for the Combined Commodity:
For each combined commodity within the portfolio for which scanning is being performed normally (not using the "liquidation risk" scanning method):
For each directly calculated requirement level for that combined commodity:
If there are any specific scanning tiers defined for the combined commodity:
The scan risk for the combined commodity is the sum of the tier scan risks for each specific scanning tier.
But if there is only the overall scanning tier for the combined commodity:
The scan risk for the combined commodity is the scan risk for that overall scanning tier.

Determining the Scan Risk and setting other values for the Combined Commodity using the Liquidation Risk Method: Each combined commodity for which Liquidation Risk has been specified as the processing method for scanning will contain only physical equity or debt securities which are considered to (a) be within the same security family and (b) have the same risk level.

Each such combined commodity will have only overall tiers defined for it for scanning, for intercommodity spreading, and for intracommodity spreading.

Each such combined commodity will have precisely one intracommodity spread defined for it, a delta-based, one to one, overall tier 1 to overall tier 1 spread. The charge rate for this spread will be specified as a decimal fraction. Intercommodity spreads referencing this combined commodity will similarly reference the overall intercommodity spread tier, with a credit rate specified as a decimal fraction.

For each combined commodity for which Liquidation Risk has been specified as the method for determining the Scan Risk:
  Take the sum of the Liquidation Risk Position Values for all positions for which this value is positive. This yields the Long Liquidation Value.
  Take the sum of the Liquidation Risk Position Values for all positions for which this value is negative. Then take the absolute value of this sum. This yields the Short Liquidation Value.
  For each directly-calculated requirement level for this combined commodity:
    Read the Liquidation Risk rates for this requirement level and combined commodity. There will be two values, the Specific Rate and the Generic Rate. (These are also referred to as the X-parameter and the Y-parameter, respectively, in the Paris Bourse documentation.)
    Take the sum of the Long Liquidation Value and the Short Liquidation Value, and multiply this result by the Specific Rate. This yields the Specific Risk.
    Take the absolute value of the difference between the Long Liquidation Value and the Short Liquidation Value, and multiply this result by the Generic Rate. This yields the Generic Risk.
    Take the sum of the Specific Risk and the Generic Risk.
    Store the Long Liquidation Value as the Long Delta for the overall Intracommodity Spread Tier.
    Store the Short Liquidation Value as the Short Delta for the overall Intracommodity Spread Tier.
    Subtract the Short Liquidation Value from the Long Liquidation Value. If this result is zero or positive, store it as the Long Delta for the overall Intercommodity Spread Tier. If this result is negative, take its absolute value and store it as the Short Delta for the overall intercommodity spread tier.
    Set the Weighted Price Risk for the overall intercommodity spread tier to 1.

Spreading: After determining the scan risk and the minimum commodity charge for each combined commodity in the portfolio, the next step is to perform spreading. As will be described below, the disclosed embodiments utilize the following spreading and hybrid spreading methodologies.

Spread groups: The SPAN algorithm supports the definition of the following groups of spreads:
  Super-intercommodity spreads
  Intra-commodity spreads
  Pre-crossmargining spreads
  Cross-margining spreads
  Inter-commodity spreads
  Inter-clearing organization ("interexchange") spreads Intra-commodity spreads and inter-commodity spreads are the most familiar types.

Intra-commodity spreads are typically used to calculate charges to recognize the risk associated with spreads formed within a combined commodity. These can be needed since the scanning process assumes perfect correlation of price movements among the various products grouped together within a combined commodity.

Inter-commodity spreads are used to recognize risk offsets, and provide appropriate credits, between positions in related combined commodities.

Inter-clearing organization spreads, often referred to as interexchange spreads, are used to recognize risk offsets and provide appropriate credits, between positions in combined commodities of different clearing organizations or other business functions of those clearing organizations. These are distinguished from normal intercommodity spreads in that each clearing organization involved in a particular spread is free to recognize or not recognize that spread, and to specify the particular credit rate applicable to its own products. This may be used when a clearing organization wishes to grant a reduction to the performance bond requirement for its own products when the risk of those products is reduced by offsetting positions on another clearing organization, regardless of whether any formal cross-margining agreement exists between those clearing organizations, and typically in the absence of any such agreement.

Super-intercommodity spreads are a new spread group created in order to allow the recognition of particular delta patterns across combined commodities, even before intracommodity spreading is performed. For example, this type of spread can be used to recognize a "tandem" relationship between two combined commodities (for the first combined commodity: long in one month, short in another; and for the second combined commodity: short in one month, long in another.)

Cross-margining spreads are a new group created in order to allow two or more clearing organizations which participate in a cross-margin agreement, to define spreads which are to be evaluated before normal intra- and inter-commodity spreading is done. The new pre-cross-margining spread group gives those same clearing organizations an opportunity to define spreads which are to be evaluated first, before the cross-margining spreading is done.

Spread types: In addition to the spread group in which they are contained, spreads may be categorized by whether they are delta-based, scanning-based, or hybrid delta-based/scanning-based.

Scanning-based spreads and hybrid spreads can only be used for the intercommodity spread groups—pre-crossmargin spreads, super-intercommodity spreads, and normal inter-commodity spreads.

Spreads in the groups that cross clearing organization and/or business function boundaries—the crossmargining spreads and the inter-clearing organization spreads—can only be delta-based.

Delta-Based Spreading: A delta-based spread is one that is formed on a delta-basis—i.e., according to the relative magnitudes and relationships of the remaining delta values for each of the legs of the spread.

A delta-based spread may contain any number of spread legs. Spreads are typically two-legged, but three, four, five or more legged-spreads may occur.

Each leg references a specific combined commodity, and for that combined commodity, one of:
- an intercommodity spread tier
- an intracommodity spread tier, or
- a delta period.

In addition, for each leg, a delta per spread ratio and a relative market side indicator are specified.

The delta per spread ratio is a positive value, which indicates the amount of delta consumed for that leg via the formation of one spread.

The relative market side indicator is either A or B, and indicates the relative relationship of the remaining deltas of the legs which must prevail in order for spreads to be formed. For example, for a typical two-legged A to B spread, either the remaining delta for the first leg must be positive and the second leg negative, or the remaining delta for the first leg must be negative and the second leg positive.

A delta-based spread also has defined for it a charge or credit method—either flat-rate, or weighted price risk:

Flat-rate is typically used for intracommodity spreads. A charge for the spread is calculated by taking the number of spreads formed and multiplying by the charge rate.

Weighted price risk is typically used for intercommodity spreads. For each participating leg, a credit for the spread is calculated by determining the total number of delta consumed by the spread, times the weighted price risk (which can be thought of as the price risk per delta), times the credit rate percentage.

Accordingly, a delta-based spread also has defined for it one or more rates, depending on how many requirement levels are being directly calculated.

For an intracommodity spread using the flat-rate method, the rates are considered to be charge rates, and a normal, positive charge rate produces an intracommodity spread charge. A negative charge rate is allowed and would produce a negative charge—i.e., a credit.

Similarly, for an intercommodity spread using the weighted price risk method, a normal, positive credit rate percentage produces a positive credit amount. If a negative credit rate had been specified for the spread, this would yield a negative credit—i.e., a charge.

Delta-based spreads using the flat rate method may have more than one combined commodity represented among their legs. If so, the resulting charge is apportioned to each leg according to the relative proportion of the absolute value of its delta per spread ratio. All such combined commodities participating in such a spread must accordingly share the same performance bond currency.

Spreads within spreads: Sometimes it may be desired to use one delta-based spread to set a limit on the total number of spreads formed via a separate set of delta-based spreads.

To handle these situations generically, delta-based spreads have been made recursive in SPAN.

That is, a delta-based spread may contain a set (one or more) of delta-based spreads, each of which may contain a set (one or more) of delta-based spreads. There are no limits to the numbers of levels of such recursions.

The spread at the top of such a hierarchy is called the top-level spread, and it is the one that contains the rate(s) for the spread. Spreads at lower levels do not have rates defined for them.

The basic idea here is that each spread sets an upper bound on the number of spreads which can be formed by spreads contained within it In the typical case, there is only one level of recursion, with a top-level spread containing a set of child spreads, each of which does not have children. In this case, the top-level spread sets an overall upper bound on the number of spreads formable by its child spreads.

Creating the combined pools of inter-clearing organization spreads and of crossmargining spreads Except for spreads in the crossmargining group and the inter-clearing organization group, spreads in each group are evaluated exchange complex by exchange complex, and it does not matter in which order the exchange complexes are processed.

For the crossmargining group and the inter-clearing organization group, however, processing is not done by exchange complex. Instead, single pools of spreads are created which include all spreads provided for any exchange complex represented in the portfolio. This process has several important characteristics:

Duplicate spreads are recognized: suppose, for example, that clearing organization X recognizes a 1 to 1, A to B spread for one of its products against a related product on clearing organization Y. Suppose further that clearing organization Y recognizes the same spread against clearing organization X.

In this case, the algorithm must recognize that these are the same spread.

Each clearing organization can only provide a credit for its own products. In this example, when clearing organization X specifies the spread, the credit rate(s) it specifies only apply to its own products. And similarly for clearing organization Y.

If clearing organization X recognizes the spread while organization Y does not, then the credit rate specified by X will apply only to X's products. Y's products will have a credit rate of zero.

If both organizations recognize the spread, there nevertheless is no guarantee that they will have the same credit rates. X may specify one rate applicable to its products, and Y may specify a different rate applicable to its products.

Spreads are prioritized by greatest total savings. The spreads in the combined pool must be prioritized according to greatest total savings across all legs.

Evaluating spreads group by group: For each exchange complex in the portfolio:
For the spreads in the super-intercommodity spread group:
Evaluate each spread within the group in turn, in order by spread priority.
For each exchange complex in the portfolio:
For the spreads in the intracommodity spread group:
Evaluate each spread within the group in turn, in order by spread priority.
Finalize the spot charges for all delta periods to which they apply.
For each exchange complex in the portfolio:
For the spreads in the pre-crossmargining spread group:
Evaluate each spread within the group in turn, in order by spread priority.
For the combined pool of crossmargining spreads:
Evaluate each spread in the pool, ordered as described above in descending order by total savings.
For each exchange complex in the portfolio:
For the spreads in the intercommodity spread group:
Evaluate each spread within the group in turn, in order by spread priority.
For the combined pool of inter-clearing organization spreads:
Evaluate each spread in the pool, ordered as described above in descending order by total savings.

Evaluating a delta-based spread—Overview: The overall process for evaluating a delta-based spread that has no child spreads can be summarized as follows:

First, check to make sure that each of the spread legs is present in the portfolio.

Then attempt to form spreads under each of the two possible assumptions of market side. In other words, first attempt to form spreads assuming that the "A" legs are long and the "B" legs are short. Then reverse the assumption and attempt to form spreads assuming that the "A" legs are short and the "B" legs are long.

Under either assumption, if any spreads can be formed, determine for each leg the delta consumed by the spread. Remove the consumed delta from the remaining delta for that spread leg. Then re-evaluate delta values as needed so that remaining period deltas, intracommodity spread tier deltas, and intercommodity spread tier deltas are kept synchronized.

Last, determine the charge or credit associated with the spreads formed.

Determining the delta consumed for a particular leg of a delta-based spread under a particular assumption of market side:
 Take the number of spreads formed.
 Multiply by the delta per spread ratio for the leg.
 If the current assumption is that the A side is long and this is a B leg, OR if the current assumption is that the A side is short and this is an leg, then multiply the above result by −1 to make it negative. (In other words, in this case, short delta has been consumed.)

Removing the delta consumed for a particular leg of a delta-based spread under a particular assumption of market side:
 Initialize the remaining delta to be removed, as the delta to be consumed.
 If the leg references a spread tier—either an intracommodity or an intercommodity spread tier, and either a specific tier or the overall tier:
  Beginning with the first delta period within the tier and continuing with each subsequent delta period within the tier, remove delta from each such period sequentially until remaining delta to be removed is zero.
 But if the leg references a specific delta period, then remove delta from that specific period.
 For each intracommodity or intercommodity spread tier containing the period from which some delta was removed decrement remaining long or short delta by the amount of delta removed from the period.

Calculating the credit for a particular leg of a delta-based spread which uses the weighted price risk method, and incrementing the credit amount for the appropriate tier: This would be for a delta-based spread that uses the weighted price risk method. Each leg of such a spread would reference either an intercommodity spread tier or a delta period for a combined commodity. If the leg references a tier, it will be either the overall intercommodity spread tier or, if specific tiers are defined, a specific intercommodity spread tier.
 Take the absolute value of the delta consumed by the spread for this leg.
 Determine the tier to use for reading the weighted price risk:
  If the leg references an intercommodity spread tier, select that tier.
  If the leg references a delta period:
   If specific intercommodity spread tiers are defined, select the specific tier containing this period.
   If no specific tiers are defined, select the overall intercommodity spread tier.
 Take the absolute value of the delta consumed by the spread for this leg and this requirement level.
 Multiply this result by the weighted price risk for the selected tier and this requirement level.
 Multiply this result by the credit rate for the spread for this leg and this requirement level.
 If the spread giving rise to this credit is in any spread group other than the cross-margin spread group or the inter-clearing organization spread group:
  Increment the intercommodity spread credit for the selected tier, by the credit for this leg for this spread.
 But if the spread giving rise to this credit is in either the cross-margin spread group or the inter-clearing organization spread group:
  Increment the inter-clearing organization spread credit for the selected tier, by the credit for this leg for this spread.
(As described above, if the credit rate were negative, this would yield a negative credit—i.e., a charge.)

Calculating the charge for a delta-based spread which uses the flat-rate method: This could apply to a pre-crossmargining spread, a super-intercommodity spread, an intracommodity spread, or an intercommodity spread.
 Take the number of spreads formed.
 Multiply by the charge rate for the spread for this requirement level.

Scanning-Based Spreads: Scanning-based spreads are inherently intercommodity spreads, and can only be present within the three spread groups which (a) include more than one combined commodity among the legs and (b) do not cross exchange complexes. These groups are: pre-crossmargin spreads, super-intercommodity spreads, and normal intercommodity spreads.

A scanning-based spread is similar to a delta-based spread in that it contains a collection of legs. Each leg, however, references only a specific combined commodity.

The relative market side indicator is not applicable to the legs of a scanning-based spread. The delta per spread ratio is applicable, but, as will be described below, its application is somewhat different for a scanning-based spread than for a delta-based spread.

One of the legs of a scanning-based spread is designated as the target leg, and there is an associated parameter of the target leg called the target leg required flag:
 If the target leg required flag is true, then the combined commodity designated as the target leg must be present in the portfolio in order for the spread to be formed, and if it is not, the spread is skipped.
 If the target leg required flag is false, then the combined commodity designated as the target leg need not be present in the portfolio in order for the spread to be formed.

Similarly, for each leg which is not the target (a "non-target leg"), there is a parameter called the leg-required flag. If any non-target leg which is specified as required is not present in the portfolio, then the spread is skipped. In other words, all required non-target legs must be present in the portfolio in order for the spread to be formed.

As with a delta-based spread, a scanning-based spread has one or more credit rates specified for it, for different account types and requirement levels for those account types.

All legs for a scanning-based spread must have the same scan point definitions.

Evaluating a Scanning-Based Spread: Verify that all of the required legs are represented in the portfolio. Skip the spread if not.

For the target leg:
Aggregate from the target leg and each of the non-target legs, thereby yielding the new value for the target leg, each of the eight types of position value, converted as needed to the performance bond currency of the target leg.
For each directly calculated requirement level:
  For each scanning tier for the target leg:
    For the target leg and for each non-target leg:
      Perform the Risk Array Scaling and Currency Conversion Algorithm:
        Take the risk array for the tier.
        For each value in the risk array:
          If this value is negative (i.e., a gain), multiply it by the credit rate expressed as a decimal fraction.
          If this leg is not the target, and if the performance bond currency for this leg is different from the performance bond currency for the target leg, then convert the value to the performance bond currency of the target.
    Take the sum all of these appropriately scaled and converted risk arrays. This yields the new risk array for the overall scanning tier for the target leg.
    Select the largest loss and determine the scan risk and active scenario, exactly as for any scanning tier.
    For each non-target leg:
      Set each value in the risk array for the tier to zero.
      Then repeat the process of selecting the largest loss and determining the scan risk, thereby setting these values to zero.
  For each delta period for the target leg:
    For the corresponding delta period for each non-target leg that exists:
      Divide the delta-per-spread ratio for the target leg by the delta-per-spread ratio for this non-target leg, yielding the aggregation ratio:
      Determine the remaining delta to be aggregated:
        Multiply the remaining delta for this delta period by the aggregation ratio.
      Determine the original delta to be aggregated:
        Multiply the original delta for this delta period by the aggregation ratio.
    Take the sum of the remaining delta to be aggregated values from the corresponding delta period for each non-target leg that exists, and add this result to the remaining delta for this delta period on the target leg, yielding the new value for remaining delta for the target leg.
    Take the sum of the original delta to be aggregated values from the corresponding delta period for each non-target leg that exists, and add this result to the original delta for this delta period on the target leg, yielding the new value for original delta for the target leg.
    Take the sum of the Delivery (Spot) Charge for Delta Consumed by Spreads from the corresponding delta period for each non-target leg that exists (converted as needed to the performance bond currency of the target leg), and add this result to the same value on the target leg, yielding the new value for Delivery (Spot) Charge for Delta Consumed by Spreads for this delta period for the target leg.
    Take the sum of the Delivery (Spot) Charge for Delta Remaining in Outrights from the corresponding delta period for each non-target leg that exists (converted as needed to the performance bond currency of the target leg), and add this result to the same value on the target leg, yielding the new value for Delivery (Spot) Charge for Delta Remaining in Outrights for this delta period for the target leg.
    Set to zero for the corresponding delta period for each non-target leg:
      Original delta and remaining delta
      Delivery charge for delta consumed by spreads, and delivery charge for delta remaining in outrights
  For each intercommodity spread tier for the target leg:
    For the target leg and for each non-target leg:
      Perform the same Risk Array Scaling and Currency Conversion Algorithm as described above for the scanning tiers
    Take the sum all of these appropriately scaled and converted risk arrays. This yields the new risk array for the intercommodity spread tier for the target leg.
    Aggregate from the target leg and each non-target leg, thereby yielding the new value for the target leg, each of the following elements:
      Intercommodity spread credit (converted as needed to the performance bond currency of the target leg)
      Inter-clearing organization spread credit (converted as needed to the performance bond currency of the target leg)
    Take the sum of the original delta for each delta period within this tier which is positive, yielding the new value for original long delta for the tier.
    Take the sum of the remaining delta for each delta period within this tier which is positive, yielding the new value for remaining long delta for the tier.
    Take the sum of the original delta for each delta period within this tier which is negative, yielding the new value for original short delta for the tier.
    Take the sum of the remaining delta for each delta period within this tier which is negative, yielding the new value for remaining short delta for the tier.
    Select the largest loss and determine the time risk, volatility risk, price risk and weighted price risk, exactly as for any intercommodity spreading tier.
    For each intercommodity spread tier for each non-target leg:
      Set each value in the risk array for the tier to zero.
      Set the original delta and remaining delta values to zero.
      Set the intercommodity spread credit and inter-clearing organization spread credit to zero.
      Repeat the process of determining the largest loss, volatility risk, time risk, price risk and weighted price risk, thereby setting all of these values to zero.
  For each intracommodity spread tier for the target leg:
    Take the sum of the original delta for each delta period within this tier which is positive, yielding the new value for original long delta for the tier.
    Take the sum of the remaining delta for each delta period within this tier which is positive, yielding the new value for remaining long delta for the tier.
    Take the sum of the original delta for each delta period within this tier which is negative, yielding the new value for original short delta for the tier.
    Take the sum of the remaining delta for each delta period within this tier which is negative, yielding the new value for remaining short delta for the tier.
    For each intracommodity spread tier for each non-target leg:
      Set the original delta and remaining delta values to zero.

For each short option minimum tier for the target leg:
  Aggregate from the target leg and the equivalent tier on each non-target leg, thereby yielding the new for the target leg, each of the following elements:
    Number of short puts
    Number of short calls
    Short option minimum charge (converted as needed to the performance bond currency for the target leg)
  For each non-target leg:
    Set the number of short puts, the number of short calls, and the short option minimum charge, to zero.
For the target leg combined commodity for this requirement level:
  Aggregate from the target leg and each non-target leg, thereby yielding the new value for the target leg:
    Intracommodity spread charge (converted as needed to the performance bond currency of the target leg)

Hybrid Delta-Based/Scanning-Based Spreads: A hybrid delta-based/scanning-based intercommodity spread combines elements of delta-based spreading and scanning-based spreading.

Hybrid spreads may be present only in the normal intercommodity spread group, or the pre-crossmargining spread group.

Like a regular delta-based spread, the delta-based spread part of the hybrid spread definition will contain a collection of delta-based spread legs. There are several restrictions, however, on the specification of the spread and of its spread legs:
  The spread is not recursive—i.e., it may not contain a subsidiary collection of delta-based spreads.
  Each spread leg may reference only the overall intercommodity spread tier of a specific combined commodity. References to specific intercommodity spread tiers or to delta periods are not allowed.
  All of the combined commodities referenced as legs of the delta-based spread must have the same performance bond currency.
  A charge rate must be specified for the delta-based spread, which rate is denominated in that same performance bond currency.

Like a scanning-based spread, a hybrid spread will also specify a target leg, which will reference a specific combined commodity. This target combined commodity is never one into which any products are linked. It is not referenced by any spread until the hybrid spread for which it is specified as the target. After this spread, it may subsequently participate in intercommodity spreading, but only as a leg of a regular delta-based spread.

Here's the detailed algorithm for evaluating a hybrid spread:
  For each directly-calculated requirement level:
  Perform the Algorithm for evaluating a top-level delta-based spread as described above, with one exception as specified herein:
    This has the effect of determining under each assumption of relative market-side, the number of delta-based spreads formable, of calculating the associated charge, and of decreasing series and tier deltas for each leg according to the delta consumed by the spread.
    The exception is that the charge calculated under each assumption of relative market-side is not apportioned back to the legs of the spread. Instead, the charges calculated under each assumption are summed to yield the basis risk.
    Take the sum of the scan risk values for each of the overall intercommodity spread tiers in the non-target legs participating in the spread, yielding the total scan risk.
    Now perform the Algorithm for evaluating a scanning-based spread as described above, using a 100% credit rate, but with the following exceptions:
      For each non-target leg, for the overall scanning tier, for any specific scanning tiers, for the overall intercommodity spreading tier, and for any specific intercommodity spreading tiers, do not set each value in the risk array for the tier to zero, and do not then re-evaluate for the tier the scan risk and (for the intercommodity spread tiers) the time risk, volatility risk, price risk and weighted price risk.
      Similarly, do not aggregate from the non-target legs to the target leg, and then set to zero on the non-target legs: the intracommodity spread charge
        for the overall intercommodity spread tier and for any specific intercommodity spread tiers, the intercommodity spread credit and the inter-clearing organization spread credit
        for each delta period, the charge for delta consumed by spreads and the charge for delta remaining in outrights
        for the overall short option minimum rate tier and for any specific short option minimum rate tiers, the short option minimum charge, and the number of short puts and the number of short calls
      For the target leg, after determining the weighted price risk:
        Save the value for the scan risk on the target leg as the scan together risk.
        For the overall intercommodity spread tier, the overall scan tier, and any specific intercommodity spread tiers and specific scanning tiers:
          set the scan risk value to zero
          for the intercommodity spread tiers, set the time risk, volatility risk, and price risk to zero, leaving only the value for weighted price risk.
    The net result of this processing is that:
      Remaining deltas have been aggregated for intracommodity spread tiers, intercommodity spread tiers, and delta periods, from the non-target legs to the target.
      Weighted price risk has been determined for the overall intercommodity spread tier on the target.
      All other elements of the SPAN risk calculation remain with the non-target legs: the scan risk, intracommodity spread charge, short option minimum, spot charge, intercommodity spread credit, and inter-clearing organization spread credit.
      The value that would have been the scan risk for the target leg in a normal scanning-based spread has been saved as the scan together risk.
    Take the sum of basis risk and scan together risk. Subtract this sum from the total scan risk. Divide this result by total scan risk. Take the larger of this result, and zero, thereby yielding the savings percentage.
    For the overall intercommodity spread tier for each non-target leg:
      Take the largest loss for the tier.
      Multiply by the savings percentage, yielding the credit for this leg for the spread.
      Round this result to the normal precision for values denominated in this currency.
      Increment the intercommodity spread credit for the tier, by this amount.

Again take the largest loss for the tier. Divide this value by the scan together risk. Save this result as the scan risk percentage for subsequent use.

Execution now proceeds to the next spread definition in the spread group, and to the remaining spread groups to be evaluated.

As it does, the overall intercommodity spread tier of the combined commodity, which was the target of the original hybrid spread, may participate as a leg of other delta-based intercommodity spreads using the weighted price risk method of determining the credit.

If this occurs, the intercommodity spread credit for the original target leg calculated as a result of that delta-based spread, is apportioned back to the original non-target legs of the original hybrid spread, in proportion to the scan risk for that leg to the total scan risk. Here's how:

For each directly-calculated requirement level for the original hybrid spread target leg:
  Take the intercommodity spread credit value just calculated.
  For each original non-target leg for the original hybrid spread:
    Multiply the above value by the scan risk percentage for that non-target leg.
    Round this result to the normal precision for the performance bond currency for that non-target leg.
    Increment the intercommodity spread credit (or the inter-clearing organization spread credit if the spread now being processed is within the inter-clearing organization spread group or the cross-margin spread group) by this result.
  Set the intercommodity spread value for the original hybrid spread target leg back to zero.

Finalizing the Spot Charge: This calculation will be performed for each combined commodity, after all spreads in the intracommodity spread group have been evaluated, but before any of the subsequent spread groups have been processed.

For each combined commodity in the portfolio:
  For each directly calculated requirement level for this combined commodity:
    For each delta period for this combined commodity to which spot charges apply:
      If for this delta period it has been specified that spot charges apply to either long or short delta, OR if it has been specified that they apply to long delta only and the remaining delta for the period is positive, OR if it has been specified that they apply to short delta only and the remaining delta for the period is negative:
        Subtract the remaining delta for this period and requirement level from the original value for delta for the period and this requirement level. Take the absolute value of this amount. This yields the delta consumed by spreads.
        Take the absolute value of the remaining delta for this period. This yields the delta remaining in outrights.
        Multiply the delta consumed by spreads, by the charge rate for delta consumed by spreads, yielding the spot charge for delta consumed by spreads for this period and requirement level.
        Multiply the delta remaining in outrights, by the charge rate for delta remaining in outrights, yielding the spot charge for delta remaining in outrights for this period and requirement level.
      Otherwise, the values for these two charges are zero.
    Sum the spot charge for delta consumed by spreads for each period, yielding the total spot charge for delta consumed by spreads for this combined commodity for this requirement level.
    Sum the spot charge for delta remaining in outrights for each period, yielding the total spot charge for delta remaining in outrights for this combined commodity for this requirement level.
    Sum the spot charge for delta consumed by spreads, and the spot charge for delta remaining in outrights, yielding the total spot charge for the combined commodity and this requirement level.

Finalizing the Intercommodity Spread Credit and the Inter-exchange Spread Credit: For each combined commodity in the portfolio:
  For each directly calculated requirement level for the combined commodity:
    Take the sum of the intercommodity spread credit for the overall intercommodity spread tier, and the intercommodity spread credits for each specific intercommodity spread tier, if any. This yields the total intercommodity spread credit for the combined commodity.
    Take the sum of the inter-clearing organization spread credit for the overall intercommodity spread tier, and the inter-clearing organization spread credits for each specific intercommodity spread tier, if any. This yields the total inter-clearing organization spread credit for the combined commodity.

Finalizing the SPAN Requirement(s) for Directly Calculated Requirement Levels: For each combined commodity in the portfolio:
  For each directly calculated requirement level for the combined commodity:
    Take the sum of the scan risk, the intracommodity charge, and the spot charge. (This value is sometimes called the commodity risk.)
    Subtract from this value, the sum of the intercommodity spread credit and the inter-clearing organization spread credit. (This value is sometimes called the prototype SPAN risk, or the pre-SPAN risk.)
    Take the larger of this value and the short option minimum.
    If a risk adjustment factor is defined for this directly calculated requirement level, multiply the above result by this risk adjustment factor.
    If the positions in this combined commodity consist solely of long positions in option products, all of which options have non-zero values for their prices, then take the smaller of this result and the current value of those options in the performance bond currency.
    The result is the SPAN risk requirement for this requirement level.

The third to last step is called capping the risk at long option value for portfolios consisting solely of long options. Note that the value at which the risk is capped may include both futures-style options and premium-style options. The key factor here is not how the options are valued, but whether they are long positions in products for which the current value of the risk is limited to the current value of the positions themselves.

Determining Derived SPAN risk requirements: For each combined commodity represented in the portfolio:

For each directly calculated requirement level for this combined commodity:
For each risk adjustment factor applicable to that requirement level or to any requirement level derived from that requirement level:
Process each such risk adjustment factor in turn:
Take the SPAN risk requirement for the base requirement level.
Multiply by the risk adjustment factor, which converts a requirement from the specified base requirement level to the specified derived requirement level.
If the positions in this combined commodity consist solely of long positions in option products, all of which options have non-zero values for their prices, then take the smaller of this result and the current value of those options in the performance bond currency.
The result is the SPAN risk requirement for the derived requirement level.

Typically risk adjustment factors used to determine derived requirements, are used to determine an initial requirement level from a maintenance requirement level.

Determining the Available Net Option Value: For each combined commodity in the portfolio:
Determine the total net value in the performance bond currency of all positions in the portfolio for this combined commodity which are valued premium-style, as follows:
Take the following four values denominated in the performance bond currency:
value of long option positions in products valued premium-style
value of short option positions in products valued premium-style
value of long non-option positions in products valued premium-style
value of short non-option positions in products valued premium-style
If there are any portion of these position values for which full credit is not being given due the premium not yet having been paid or collected, adjust these values accordingly to remove that portion.
Subtract the adjusted value of short option positions valued premium-style from the adjusted value of long option positions valued premium-style, yielding the net value of option positions valued premium-style.
Subtract the adjusted value of short non-option positions valued premium-style from the adjusted value of long non-option positions valued premium-style, yielding the net value of non-option positions valued premium-style.
Take the sum of these two net values, yielding the net adjusted value of positions valued premium-style.
For each requirement level for this combined commodity (whether directly calculated or derived):
If for this combined commodity capping off available net option value at the risk has been enabled, then take the smaller of the net adjusted value of positions valued premium-style, and the SPAN risk requirement, yielding the available net option value for this requirement level.
But if such capping has not been enabled, the available net option value for this requirement level is equal to the net adjusted value of positions valued premium-style.

The SPAN calculation for omnibus accounts and other gross-margined firm-level accounts: As described above in the introductory section, Portfolios to be margined, an omnibus account is:
a firm-level account type
for which total positions are maintained on a gross basis—i.e., they may be simultaneously long and short
for which subaccounts may be defined
for which the portion of the total long and total short positions which are not contained in said defined subaccounts, are considered to be the naked long and naked short positions
for which the naked long and naked short positions are margined on a gross basis—in other words, treated as if each such naked long position and each such naked short position is in a portfolio by itself, without any risk reductions due to offsetting positions.

Generically, a gross-margined firm-level account is any such account for which naked long and naked short positions are margined in this manner. An omnibus account may be considered to be an example of such an account for which there may also be positions in defined subaccounts.

This section describes the overall process for determining the SPAN risk requirements and the Available Net Option Values for the combined commodities represented in the portfolio for gross-margined firm-level accounts. This process consists of:
Determining the naked long and naked short positions
Calculating SPAN requirements for the subaccounts, if any
Calculating SPAN requirements for the naked positions
Aggregating SPAN requirements for the subaccounts with the SPAN requirements for the naked positions, in order to determine the total SPAN requirement values for the combined commodity.

Determining the Naked Positions: For each position in the omnibus account:
Take the sum of all subaccount positions in this product that are net long.
Subtract this result from the Total Long position quantity for the omnibus account, yielding the Naked Long position.
Take the absolute value of the sum of all subaccount positions in this product that are net short.
Subtract this result from the Total Short position quantity for the omnibus account, yielding the Naked Short position.

Note that for each product represented in the omnibus account portfolio, the Total Long position must be at least as great as the sum of the subaccount positions that are net long, and the Total Short position must be at least as great as the absolute value of the sum of the subaccount positions that are net short. Naked position quantities may be zero, but by definition they may never be negative.

Calculating SPAN requirements for subaccounts: Whenever the SPAN calculation is to be performed for an omnibus account, after determining the naked positions, the normal SPAN calculation for net portfolios should be performed for each subaccount of that omnibus account, if any are defined.

For each such subaccount, for each combined commodity represented in the portfolio for the subaccount, the result will be the SPAN risk requirement and Available Net Option Value for each directly-calculated and indirectly-calculated requirement level for that combined commodity.

Evaluating the SPAN requirements for the subaccounts first simplifies the SPAN calculation for the omnibus account, in that it ensures that the subaccount requirements will be available for aggregation to the omnibus account when they are needed.

Calculating SPAN requirements for naked positions: For each combined commodity in the portfolio:
For each position for this combined commodity:
For the naked long position quantity, perform the Naked Position SPAN evaluation algorithm to determine for each directly and indirectly calculated requirement level for this combined commodity:
the SPAN risk requirement
the Available Net Option Value
For the naked short position quantity, perform the Naked Position SPAN evaluation algorithm to determine for each directly and indirectly calculated requirement level for this combined commodity:
the SPAN risk requirement
the Available Net Option Value
For each directly and indirectly calculated requirement level for this combined commodity:
Sum the SPAN requirement for naked longs for this requirement level, and the SPAN requirement for naked shorts for this requirement level, yielding the total SPAN requirement for nakeds for this position and this requirement level.
Sum the Available Net Option Value for naked longs for this requirement level, and the Available Net Option Value for naked shorts for this requirement level, yielding the total Available Net Option Value for nakeds for this position and this requirement level.
For each directly and indirectly calculated requirement level:
Take the sum of the SPAN requirement for nakeds, across all positions for the combined commodity, yielding the SPAN requirement for naked positions for the combined commodity for this requirement level.
Take the sum of the Available Net Option Value for nakeds, across all positions for the combined commodity, yielding the Available Net Option Value for naked positions for the combined commodity for this requirement level.

Naked Position SPAN Evaluation Algorithm: As described above, this algorithm is described to either the naked long quantity or the naked short quantity of a position held in a gross-margined account, either at the firm-level or the clearing-level.
Create a net portfolio for the purpose of this calculation, consisting solely of this naked long (or naked short) position.
Apply the SPAN algorithm to this net portfolio.
For each requirement level directly calculated:
Determine the SPAN requirement and the Available Net Option Value for this requirement level and for the combined commodity containing the net position.
If split allocation or margining-positions-as-equivalents caused other combined commodities to be represented in the portfolio:
For each such other combined commodity, determine the value of the SPAN requirement and the Available Net Option Value for that other combined commodity, in the performance bond currency of the original combined commodity containing the position:
If the performance bond currency of this other combined commodity is the same as the performance bond currency of the combined commodity containing the positions, simply take the SPAN requirement and the Available Net Option Value for that other combined commodity.
But if these two currencies are not the same:
Multiply the SPAN requirement for the other combined commodity by the appropriate rate to convert it to the performance bond currency of the original combined commodity, and round this result to the normal precision for that original performance bond currency.
Multiply the Available Net Option Value for the other combined commodity by the same rate, and round this result to the normal precision for that original performance bond currency.
Take the sum of these equivalent values for SPAN requirement, across all such other combined commodities.
Increment the SPAN requirement for the original combined commodity containing the net position, by this sum.
Take the sum of the equivalent values for Available Net Option Value, across all such other combined commodities.
Increment the SPAN requirement for the original combined commodity containing the net position, by this sum.
The result so far is the SPAN requirement and the Available Net Option Value for the naked long (or naked short) position for this directly calculated requirement level.
If any requirement levels are derived from this directly calculated requirement level, apply the risk adjustment factor(s) in turn to determine the derived SPAN risk requirement and Available Net Option Value for the naked long (or naked short) position for each such derived requirement.

Aggregating SPAN requirements for Naked Positions with SPAN requirements for subaccounts: For each combined commodity represented in the omnibus account portfolio:
For each requirement level for which requirements have been determined for this portfolio, whether directly or indirectly calculated:
Take the sum of the SPAN risk requirements for this requirement level across all subaccount portfolios in which this combined commodity is represented. This yields the total SPAN risk requirement for subaccounts for this requirement level.
Similarly, take the sum of the Available Net Option Values for this requirement level across all subaccount portfolios in which this combined commodity is represented. This yields the total Available Net Option Value for subaccounts for this requirement level.
Take the sum of the total SPAN risk requirement for subaccounts, and the total SPAN risk requirements for naked positions, yielding the overall SPAN risk requirement for the combined commodity and this requirement level.
Similarly, take the sum of the total Available Net Option Value for subaccounts, and the total Available Net Option Value for naked positions, yielding the overall Available Net Option Value for the combined commodity and this requirement level.

The SPAN Calculation for Gross-Margined Clearing-Level Accounts: Specification of gross clearing-level positions As described above in the introductory section Portfolios to be margined, when a clearing-level account is said to be gross-margined, this means the following.

First, positions are maintained on a gross basis. For any particular position in the portfolio, a Total Long position and a Total Short position are defined.

Second, of the Total Long and Total Short position quantities, some portion is specified to be intercommodity spreadable and some portion is said to be intracommodity spreadable. Positions that are neither inter nor intracommodity spreadable are naked.

So for each position in a gross-margined clearing-level portfolio, six position quantity values will be specified:
Total Long
Total Short
Intracommodity Spreadable Long
Intracommodity Spreadable Short
Intercommodity Spreadable Long
Intercommodity Spreadable Short
Naked Long
Naked Short Note that we are following the same convention as with gross-margined firm-level accounts, where both long and short position quantities are expressed as positive numbers.

At the CME, when clearing member firms report their positions for a processing cycle, they specify for each position the total long and short quantities, the intracommodity spreadable long and short quantities, and the intercommodity spreadable long and short quantities.

The naked long quantity is then determined by subtracting the intracommodity spreadable long quantity and the intercommodity spreadable long quantity from the total long quantity, and analogously for the naked short quantity.

By definition, the total long quantity must always be the sum of the intracommodity spreadable long, the intercommodity spreadable long, and the naked long. The total short must always be the sum of the intracommodity spreadable short, the intercommodity spreadable short, and the naked short.

Overall SPAN process for gross-margined clearing-level portfolios: For each position in the portfolio:
  Determine the intracommodity spreadable net position quantity by subtracting the intracommodity spreadable short quantity from the intracommodity spreadable long quantity.
  Determine the intercommodity spreadable net position quantity by subtracting the intercommodity spreadable short quantity from the intercommodity spreadable long quantity.
  Process the portfolio of intercommodity spreadable net positions through the SPAN algorithm as described above for net portfolios. This yields, for each combined commodity in the portfolio, for each directly and indirectly-calculated requirement level for that combined commodity, the SPAN requirement and the Available Net Option Value for the intercommodity spreadable positions.
  Process the portfolio of intracommodity spreadable net positions through SPAN algorithm as described above for net portfolios, but omit processing of all of the spread groups except the intracommodity spread group. The result is, for each combined commodity in the portfolio, for each directly and indirectly-calculated requirement level for that combined commodity, the SPAN requirement and the Available Net Option Value for the intracommodity spreadable positions.
  Process each naked long and naked short position through the SPAN algorithm for naked positions, and aggregate the resulting naked risk requirements and available net option values to the combined commodity level, exactly as described above for omnibus accounts. The result is, for each combined commodity in the portfolio, for each directly and indirectly calculated requirement level for that combined commodity, the SPAN requirement and the Available Net Option Value for naked positions.
  For each combined commodity in the portfolio:
    For each directly and indirectly calculated requirement level for the combined commodity:
      Take the sum of the SPAN risk requirement for intercommodity spreadable positions, the SPAN risk requirement for intracommodity spreadable positions, and the SPAN risk requirement for naked positions. The result is the total SPAN risk requirement for the combined commodity for this requirement level.
      Take the sum of the Available Net Option Value for intercommodity spreadable positions, the Available Net Option Value for intracommodity spreadable positions, and the Available Net Option Value for naked positions. The result is the total Available Net Option Value for the combined commodity for this requirement level.

Aggregation of Values from Combined Commodities: Determining values to use for aggregation for each combined commodity
  Determine the highest performance bond class for which requirement have been calculated among all combined commodities represented within the portfolio.
  For each combined commodity in the portfolio:
    For each such performance bond class for which requirements have been calculated, beginning with the core class and ascending in priority order to the highest class represented in the portfolio:
      If requirements were calculated for this class:
        Use the calculated values for the following four values, as the values to use for aggregation:
          SPAN requirement—maintenance—specified class
          SPAN requirement—initial—specified class
          Available Net Option Value—maintenance—specified class
          Available Net Option Value—initial—specified class
      But if requirements were not calculated for this class for this combined commodity:
        Use the above four values for aggregation for the immediately preceding class, as the values for aggregation for this class.

Aggregation of currency-level requirements from combined commodities to report groups, exchange complexes, and the overall portfolio level:
  For each exchange complex represented in the portfolio:
    For each combined commodity report group for this exchange complex:
      Determine the set of performance bond currencies represented among the combined commodities for this report group within this exchange complex.

For each such performance bond currency represented within the group:
- For each performance bond class for which requirements have been calculated within the portfolio:
  - Take the sum of the values for aggregation, for this class, for any combined commodity within the group with this performance bond currency, of the following:
    - SPAN requirement—maintenance—specified class
    - SPAN requirement—initial—specified class
    - Available Net Option Value—maintenance—specified class
    - Available Net Option Value—initial—specified class
  - The result is the specified value, for the specified class, for the specified performance bond currency, for the specified report group with the specified exchange complex.

For each exchange complex represented in the portfolio:

Determine the set of performance bond currencies represented among the combined commodities within this exchange complex.

For each such performance bond currency represented within the exchange complex:
- For each performance bond class for which requirements have been calculated within the portfolio:
  - Take the sum of the values for aggregation, for this class, for any combined commodity within the exchange complex with this performance bond currency, of the following:
    - SPAN requirement—maintenance—specified class
    - SPAN requirement—initial—specified class
    - Available Net Option Value—maintenance—specified class
    - Available Net Option Value—initial—specified class
  - The result is the specified value, for the specified class, for the specified performance bond currency, for the specified exchange complex.

For the total portfolio:

Determine the set of performance bond currencies represented among the combined commodities within the total portfolio.

For each such performance bond currency represented:
- For each performance bond class for which requirements have been calculated within the portfolio:
  - Take the sum of the values for aggregation, for this class, for any combined commodity within the portfolio, of the following:
    - SPAN requirement—maintenance—specified class
    - SPAN requirement—initial—specified class
    - Available Net Option Value—maintenance—specified class
    - Available Net Option Value—initial—specified class
  - The result is the specified value, for the specified class, for the specified performance bond currency, for the total portfolio.

Determining Portfolio-Currency Equivalent Requirement Values: For each exchange complex within the portfolio:
For each report group within that exchange complex:
For each performance bond class for which requirements have been calculated within the portfolio:
- For each performance bond currency represented within that report group:
  - Determine the portfolio-currency equivalents as specified below, of the following four values:
    - SPAN requirement—maintenance—specified class
    - SPAN requirement—initial—specified class
    - Available Net Option Value—maintenance—specified class
    - Available Net Option Value—initial—specified class
  - If the portfolio currency is equal to this performance bond currency, then the portfolio currency value is the specified value.
  - But if the portfolio currency is different from this performance bond currency, determine the portfolio currency equivalent value:
    - Multiply the value in the performance bond currency by the appropriate conversion rate. Then round to the normal precision for this portfolio currency.
- Take the sum of the portfolio-currency equivalent value for the maintenance SPAN requirement for this class for the different performance bond currencies, yielding the total portfolio-currency equivalent value for the maintenance SPAN requirement for this class and this report group.
- Take the sum of the portfolio-currency equivalent value for the initial SPAN requirement for this class for the different performance bond currencies, yielding the total portfolio-currency equivalent value for the initial SPAN requirement for this class and this report group.
- Take the sum of the portfolio-currency equivalent value for the maintenance Available Net Option Value for this class for the different performance bond currencies, yielding the total portfolio-currency equivalent value for the maintenance Available Net Option Value for this class and this report group.
- Take the sum of the portfolio-currency equivalent value for the initial Available Net Option Value for this class for the different performance bond currencies, yielding the total portfolio-currency equivalent value for the initial Available Net Option Value for this class and this report group.

For each exchange complex within the portfolio:
For each performance bond class for which requirements have been calculated for this exchange complex within the portfolio:
- For each performance bond currency represented within that exchange complex:
  - Determine the portfolio-currency equivalents as specified below, of the following four values, exactly as this was done above:
    - SPAN requirement—maintenance—specified class
    - SPAN requirement—initial—specified class
    - Available Net Option Value—maintenance—specified class
    - Available Net Option Value—initial—specified class Take the sum of the portfolio-currency equivalent value for the maintenance SPAN requirement for this class for the different performance bond currencies, yielding the total portfolio-currency equivalent value for the maintenance SPAN requirement for this class and this exchange complex.

Take the sum of the portfolio-currency equivalent value for the initial SPAN requirement for this class for the different performance bond currencies, yielding the total portfolio-currency equivalent value for the initial SPAN requirement for this class and this exchange complex.

Take the sum of the portfolio-currency equivalent value for the maintenance Available Net Option Value for this class for the different performance bond currencies, yielding the total portfolio-currency equivalent value for the maintenance Available Net Option Value for this class and this exchange complex.

Take the sum of the portfolio-currency equivalent value for the initial Available Net Option Value for this class for the different performance bond currencies, yielding the total portfolio-currency equivalent value for the initial Available Net Option Value for this class and this exchange complex.

For the total portfolio:

For each performance bond class for which requirements have been calculated within the portfolio:

For each performance bond currency represented within the total portfolio:

Determine the portfolio-currency equivalents as specified below, of the following four values, exactly as this was done above:

SPAN requirement—maintenance—specified class

SPAN requirement—initial—specified class

Available Net Option Value—maintenance—specified class

Available Net Option Value—initial—specified class

Take the sum of the portfolio-currency equivalent value for the maintenance SPAN requirement for this class for the different performance bond currencies, yielding the total portfolio-currency equivalent value for the maintenance SPAN requirement for this class and the total portfolio.

Take the sum of the portfolio-currency equivalent value for the initial SPAN requirement for this class for the different performance bond currencies, yielding the total portfolio-currency equivalent value for the initial SPAN requirement for this class and the total portfolio.

Take the sum of the portfolio-currency equivalent value for the maintenance Available Net Option Value for this class for the different performance bond currencies, yielding the total portfolio-currency equivalent value for the maintenance Available Net Option Value for this class and the total portfolio.

Take the sum of the portfolio-currency equivalent value for the initial Available Net Option Value for this class for the different performance bond currencies, yielding the total portfolio-currency equivalent value for the initial Available Net Option Value for this class and the total portfolio.

Comparison of collateral to requirements and determination of whether an excess or a deficiency exists: The SPAN algorithm determines the SPAN requirements and available net option value for the different requirement levels for each combined commodity within the portfolio, and aggregates of these values to the report group, exchange complex and total portfolio levels, both by performance bond currency represented and as equivalent values in the portfolio currency.

The valuation of collateral deposited to meet requirements, the comparison of collateral to requirements and the determination of excess or deficit amounts is, strictly speaking, outside the scope of SPAN. At the clearing-level, and especially if requirements are calculated for more than one performance bond class and if various different types of collateral are accepted, this process can be complex.

For ordinary customer accounts at the firm-level, where only one class of performance bond requirement is calculated, the process is typically much simpler, and is described herein.

Determine the overall value in the portfolio currency to be used for margining (the "performance bond" value) of non-cash collateral assets. This value is typically called the securities on deposit.

Determine the net value in the portfolio currency of cash in the account due to gains (or losses) on open positions in products valued futures-style. This value is typically called the open trade equity.

Determine the net value in the portfolio currency of all other cash in the account. This value is typically called the ledger balance.

Take the sum of the above three values, plus the available net option value for the maintenance requirement for the core performance bond class. This yields the funds available for margin for the core maintenance requirement.

Take the sum of the above three values, plus the available net option value for the initial requirement for the core class. This yields the funds available for margin for the core initial requirement.

Determine whether the portfolio is considered "new" or "existing":

If the portfolio contained no positions whatever at the close of business for the preceding business day, then portfolio is considered to be a new one.

Otherwise, the portfolio is considered to be a previously existing one.

If the portfolio is considered "existing" and If the funds available for margin for the maintenance requirement for the core class, is greater than or equal to the core maintenance SPAN requirement:

Then the maintenance requirement is deemed to be applicable. The applicable SPAN risk requirement is the SPAN requirement for maintenance for the core class, and the applicable funds available for margin is equal to the funds available for margin for maintenance for the core class.

But if the portfolio is considered "new" or if it is considered existing, but the funds available for margin for the maintenance requirement for the core class is less than the SPAN requirement for maintenance for the core class:

Then the initial requirement is deemed to be applicable. The applicable SPAN risk requirement is the SPAN requirement for initial for the core class, and the applicable funds available for margin is the funds available for margin for initial for the core class.

Subtract the applicable SPAN requirement from the applicable funds available for margin, yielding the excess (if this value is positive) or deficit (if this value is negative) amount.

Note that in most cases for customer account types other than speculators, and in some cases for speculators, the initial requirement is equal to the maintenance requirement, and accordingly the initial funds available for margin is equal to the maintenance funds available for margin. The logic described above simplifies substantially in this case.

Even in cases where initial requirements are different from maintenance requirements, funds available for margin for initial is typically equal to funds available for margin for maintenance. These two values could only be different if combined commodities are represented within the portfolio for which the available net option value is capped at the risk.

Traditionally, margins have been determined based on the open positions of a trader at a given time, irrespective of the trader's trading activity history. Thus, two traders that at the end of the day both have identical open positions would be assessed the same margin requirement. If one of those traders is a heavy trader during the day between margin calculations, that trader possess a greater risk of default to the exchange than do the other traders. Thus, that trader should be assessed a higher margin requirement. Also, if a trader's trading activities varies substantially from that trader's norm, a higher margin may also be assessed. The disclosed embodiments relate to factoring in a trader's trading activity into the margin requirements has never been done in the futures industry. In the securities arena, day traders are assessed different margins than non-day-traders, however, the specific profile of the trader is analyzed (that is, the same rule applies to all day traders).

FIG. 1 shows an exemplary risk management system 100 according to one embodiment. Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exemplary risk management system 100 includes a risk analysis engine 102. The risk analysis engine 102 receives a portfolio 104 to be analyzed and a set of parameters 108 which control the analysis. The engine 102 then generates an assessment of the risk 110 in the portfolio 104. In one embodiment, the engine 102 may also receive actual market data 106, real time or historical, to be factored into the risk analysis. In one embodiment, the risk analysis engine 102 is the SPAN® software published by the Chicago Mercantile Exchange Inc., located in Chicago, Ill., described above. The portfolio 104, as described above, includes the positions, i.e. contracts, options, etc. for which the given entity has entered into but not closed out during a given trading period, i.e. the open positions, for a given entity of interest. The entity for which the portfolio applies may be a trader, a brokerage house (all of the traders affiliated therewith), or a clearing member, etc.

The parameter set 108, as described above, includes parameters, as described above, which are determined by the entity performing the analysis to reflect the risk coverage desired in any particular market. These parameters 108 may include, but are not limited to:

Price Scan Range: A set range of potential price changes;
Volatility Scan Range: A set range of potential implied volatility changes;
Intra commodity Spread Charge: An amount that accounts for risk (basis risk) of calendar spreads or different expirations of the same product, which are not perfectly correlated;
Short Option Minimum: Minimum margin requirement for short option positions;
Spot Charge: A charge that covers the increased risk of positions in deliverable instruments near expiration; and
Intercommodity Spread Credit: Margin credit for offsetting positions between correlated products.

In operation, as described above, the portfolio 104 and parameter set 108, and possibly the market data 106, are input into the engine 102. The engine 102 processes the data and generates the assessment 110. The engine 102 may operate in batch to process multiple portfolios, using the same or different parameter sets 108/market data 106, or may process one portfolio at a time. As was described above, the engine 102 may be operated by a clearing house of an exchange to assess actual required performance bonds, or changes thereto. The engine 102 may also be operated by entities which are subject to such performance bonds in order to anticipate the requirements of the clearing house. Further, engine 102, as described below, provides accurate determinations as to the risk in the portfolio 104 to ensure that the clearing house is adequately protected and that those subject to the bond requirements are not unduly burdened with unnecessary requirements.

In one embodiment, the engine 102 executes on a computer having a Pentium-class processor, or suitable equivalent, a hard disk drive, for example a hard disk drive having a 10 gigabyte capacity, a memory, for example a memory having a 1 gigabyte capacity, and a suitable output device such as flat panel LCD display. Further, the computer executes an appropriate operating system, such as Microsoft Windows XP, published by the Microsoft Corporation, located in Redmond, Wash. The computer system 102 further may include a network interface and accompanying software for coupling the system with a network, the interface being of a suitable type for the network, such as an Ethernet or optical based network. The network may be a public or private network, such as the Internet, an intranet, a virtual private network, or other TCP/IP or non-TCP/IP based network as is known. Further, secure protocols, such as sHTTP or encryption, may be included to protect communications from being intercepted or modified and to generally authenticate users and ensure secure operation. It will be appreciated that any suitable computer system having suitable processing, storage and communications capabilities may be used with the disclosed embodiments, such as a mainframe computer, a mini-computer, a workstation, a personal computer or a personal digital assistant. It will be further appreciated the disclosed embodiments may be executed on a single computer system or one or more the components may be executed on a computer system which is separate from one or more computer system(s) executing the remaining of the components, and suitably interconnected, such as via a network.

While the disclosed embodiments relate to a computer software program which is stored in the memory of a computer and executed by the processor(s) of the computer to perform the disclosed functions, it will be appreciated that one or more of the disclosed components may be implemented in hardware or a combination of hardware and software, and is implementation dependent.

Figure 2:
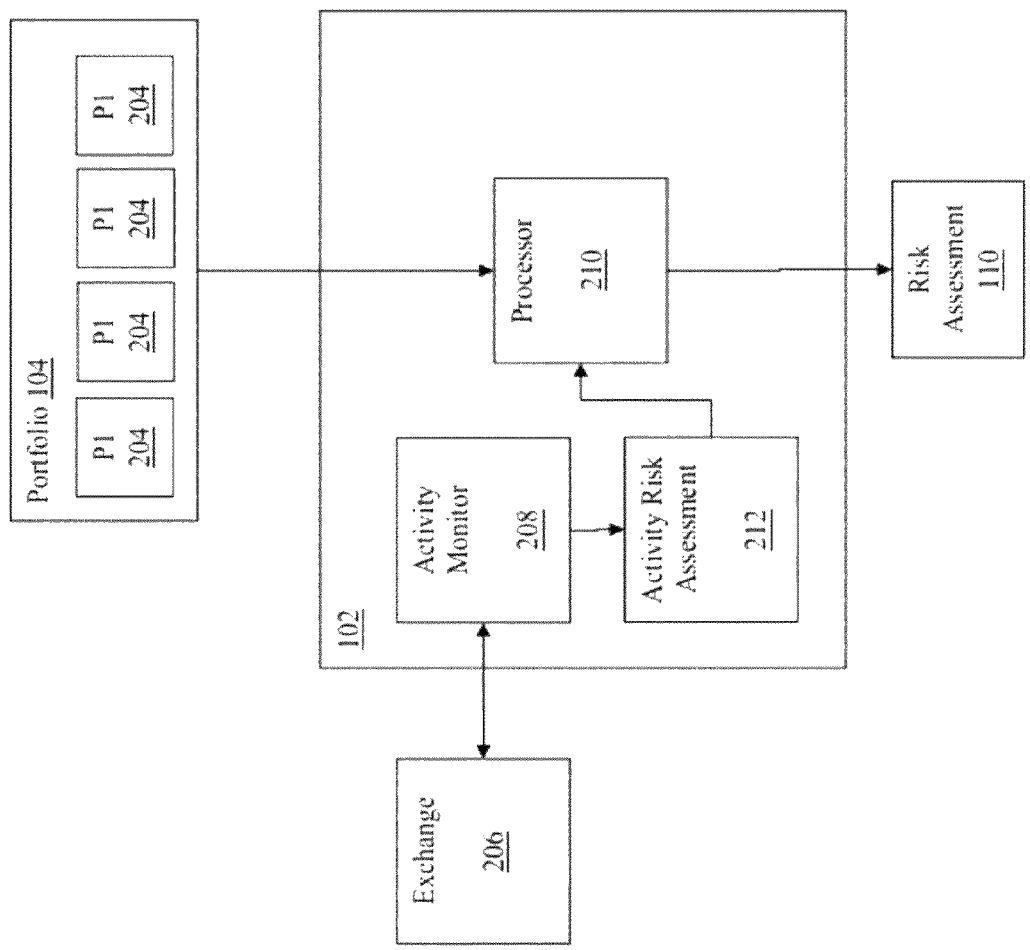
FIG. 2 depicts a block diagram of a risk management engine for use with the system of FIG. 1.

As shown in FIG. 2, in one embodiment, the engine 102 includes a risk processor 210 which receives, as inputs, data regarding the portfolio 104. In addition, the engine 102 includes an activity monitor 208 which is coupled with an exchange so as to be able to monitor the trading activity of a trader, brokerage house or other entity associated with the portfolio 104 being analyzed. The engine 102 further includes an activity risk assessment processor 212 coupled with the activity monitor 208 and the processor 210. The activity risk assessment processor 212 receives data representing the monitored activity of the given entity and generates risk assessment based upon this activity. This risk assessment is then passed to the risk processor 210 to be factored into the overall risk assessment 110 computation. In alternate embodiment, the activity monitor 208 may store a record of the activity that is monitored in a historical activity database (not shown). In computing the activity based risk assessment, the activity risk assessment processor 210 accesses this historical database and factors the entity's historical activity into the activity based risk assessment.

Figure 3:
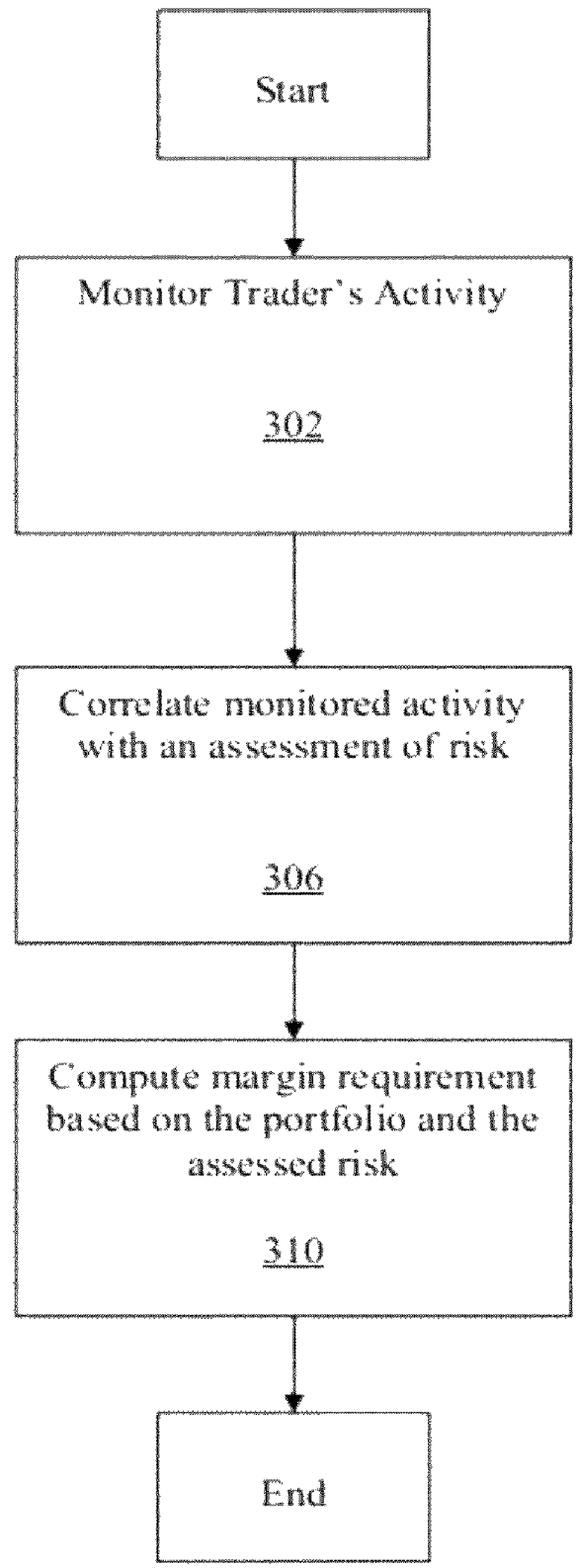
FIG. 3 depicts flow chart showing exemplary operation of the risk management system of FIG. 1, according to one embodiment.

FIG. 3 shows a flow chart illustrating method for managing risk associated with a portfolio using the disclosed. As discussed above, the portfolio 104 typically includes a number of positions 204, each of the positions 204 being associated with at least one product traded on an exchange. The method includes: monitoring the trader's activity on the exchange for a present time period; correlating the monitored activity with an assessment of risk; and computing the margin requirement based on the portfolio of products and the assessed risk. In one embodiment, the computing further comprises increasing the margin requirement as activity increases. In an alternate embodiment, the method further includes: storing past trader activity; and comparing the trader's activity for the present period of time with the stored past trader activity; wherein the computing further comprises computing the margin requirement based on the comparison.

It is therefore intended that the foregoing detailed description be regarded as illustrative rather than limiting, and that it be understood that it is the following claims, including all equivalents, that are intended to define the spirit and scope of this invention.

We claim:

1. A method of determining a margin requirement for a portfolio of products traded on an exchange, the method comprising:
storing past trading activity in a database, wherein the past trading activity occurred before a predetermined time period;
comparing, by a processor, the trading activity for the predetermined time period with the stored past trading activity;
determining, by the processor, that trading activity of the portfolio of products on the exchange during the predetermined time period varies from the stored past trading activity;
correlating, by the processor, trading activity of the portfolio of products on the exchange during the predetermined time period with an assessment of risk based on the determining; and
computing, by the processor, the margin requirement based on the portfolio of products and the assessment of risk wherein the margin requirement is increased if it is determined that the trading activity of the portfolio of products on the exchange during the predetermined time period varies from the stored past trading activity.

2. The method of claim 1, further comprising:
storing, in a memory, the trading activity of the portfolio of products on the exchange during the predetermined time period.

3. The method of claim 1, further comprising:
monitoring, by the processor, the trading activity of the portfolio of products on the exchange during the predetermined time period.

4. The method of claim 1, further comprising:
determining whether the portfolio of products included any positions at a close of a preceding trading period; and
setting the margin requirement to an initial margin requirement based on the portfolio of products, if the portfolio of products did not include any positions at the close of the preceding trading period.

5. The method of claim 1, wherein the trading activity is a trading volume associated with the portfolio of products.

6. The method of claim 1, wherein the assessment of risk for the trading activity is correlated for the portfolio of products based on at least one parameter selected from a group consisting of a range of potential price changes, a range of implied volatility, an intracommodity spread amount, an intercommodity spread amount, and a short option minimum amount.

7. The method of claim 1 wherein the past trading activity is associated with a trading entity and the trading activity of the portfolio of products is associated with the trading entity.

8. The method of claim 1, wherein the past trading activity is historical data associated with a plurality of trading entities.

9. A system for determining margin requirements for a portfolio of positions on products traded on an exchange, the system comprising:
a database configured to store past trader activity;
a memory configured to store trading activity associated with the portfolio of positions on products on the exchange during a trading time period;
a processor configured to correlate the trading activity with an assessment of risk and compute the margin requirement based on the portfolio of positions of products and the assessment of risk, wherein the processor is further configured to compare the trading activity for the trading time period with the stored past trader activity and compute the margin requirement based on the comparison, the margin requirement being increased when the activity during the trading time period varies from the past trader activity.

10. The system of claim 9, further comprising:
determining whether the portfolio included any positions at a close of a preceding trading period; and
setting the margin requirement to an initial margin requirement based on the portfolio, if the portfolio did not include any positions at the close of the preceding trading period.

11. The system of claim 10, wherein the margin requirement is a maintenance margin requirement, wherein the initial margin requirement exceeds the maintenance margin requirement.

12. The system of claim 9, wherein the margin requirement increases as the trading volume associated with the portfolio of positions on products increases.

13. The system of claim 9, wherein the assessment of risk for the trading activity is correlated for the portfolio of positions on products based on at least one parameter selected from a group consisting of a range of potential price changes, a range of implied volatility, an intracommodity spread amount, an intercommodity spread amount, and a short option minimum amount.

14. A method of determining a margin requirement for a portfolio, the method comprising:

storing past trader activity in a database;

monitoring current trading activity associated with the portfolio;

comparing, by a processor, the current trading activity with the stored past trader activity to correlate the portfolio with an assessment of risk; and computing, by the processor, the margin requirement based on the comparison as a function of a variance between the current and past trading activity.

15. The method of claim 14, further comprising:

determining whether the portfolio included any positions at a close of a preceding trading interval; and setting the margin requirement to an initial margin requirement based on the portfolio, if the portfolio did not include any positions at the close of the preceding trading interval.

16. The method of claim 14, wherein the margin requirement is a maintenance margin requirement, wherein the initial margin requirement exceeds the maintenance margin requirement.

17. The method of claim 14, wherein the margin requirement increases as the trading volume associated with the portfolio.

18. The method of claim 14, wherein the assessment of risk for the trading activity is correlated for the portfolio based on at least one parameter selected from a group consisting of a range of potential price changes, a range of implied volatility, an intracommodity spread amount, an intercommodity spread amount, and a short option minimum amount.

\* \* \* \* \*